United States Patent
Hassani et al.

(10) Patent No.: US 11,789,442 B2
(45) Date of Patent: Oct. 17, 2023

(54) ANOMALOUS INPUT DETECTION

(71) Applicant: Ford Global Technologies, LLC, Dearborn, MI (US)

(72) Inventors: Ali Hassani, Ann Arbor, MI (US); Adil Nizam Siddiqui, Farmington Hills, MI (US); Vivekanandh Elangovan, Canton, MI (US); Jeff Dippel, New Hamburg (CA)

( * ) Notice: Subject to any disclaimer, the term of this patent is extended or adjusted under 35 U.S.C. 154(b) by 658 days.

(21) Appl. No.: 16/270,331

(22) Filed: Feb. 7, 2019

(65) Prior Publication Data

US 2020/0257284 A1    Aug. 13, 2020

(51) Int. Cl.
| | |
|---|---|
| G05D 1/00 | (2006.01) |
| G06F 3/041 | (2006.01) |
| G06F 3/04886 | (2022.01) |
| B60W 30/06 | (2006.01) |

(52) U.S. Cl.
CPC ........... *G05D 1/0016* (2013.01); *B60W 30/06* (2013.01); *G05D 1/0022* (2013.01); *G06F 3/04186* (2019.05); *G06F 3/04886* (2013.01); *G05D 2201/0213* (2013.01)

(58) Field of Classification Search
CPC .............. G05D 1/0016; G05D 1/0022; G05D 2201/0213; G06F 3/04186; G06F 3/04886; B60W 30/06
See application file for complete search history.

(56) References Cited

U.S. PATENT DOCUMENTS

| | | |
|---|---|---|
| 5,959,724 A | 9/1999 | Izumi |
| 6,275,754 B1 | 8/2001 | Shimizu |
| 6,356,828 B1 | 3/2002 | Shimizu |
| 6,452,617 B1 | 9/2002 | Bates |
| 6,476,730 B2 | 11/2002 | Kakinami |
| 6,477,260 B1 | 11/2002 | Shimomura |
| 6,657,555 B2 | 12/2003 | Shimizu |
| 6,683,539 B2 | 1/2004 | Trajkovic |
| 6,724,322 B2 | 4/2004 | Tang |
| 6,744,364 B2 | 6/2004 | Wathen |

(Continued)

FOREIGN PATENT DOCUMENTS

| | | |
|---|---|---|
| CN | 101929921 A | 12/2010 |
| CN | 103818204 A | 5/2014 |

(Continued)

OTHER PUBLICATIONS

US 9,772,406 B2, 09/2017, Liu (withdrawn)

(Continued)

*Primary Examiner* — Tarek Elarabi
(74) *Attorney, Agent, or Firm* — Frank Lollo; Eversheds Sutherland (US) LLP

(57) ABSTRACT

Method and apparatus are disclosed for interface verification for vehicle remote park-assist. An example vehicle system includes a mobile device and a vehicle autonomy unit. The mobile device includes a touchscreen and a controller. The controller is to present, via the touchscreen, an interface of a remote parking app and receive, via the touchscreen, an input responsive to the presentation of the interface. The vehicle autonomy unit receives an input signal from the mobile device and an input classifier coupled to the vehicle autonomy unit verifies the received input signal complies with an input classification.

20 Claims, 7 Drawing Sheets

(56) References Cited

U.S. PATENT DOCUMENTS

| | | |
|---|---|---|
| 6,768,420 B2 | 7/2004 | McCarthy |
| 6,801,855 B1 | 10/2004 | Walters |
| 6,850,844 B1 | 1/2005 | Walters |
| 6,850,148 B2 | 2/2005 | Masudaya |
| 6,927,685 B2 | 8/2005 | Wathen |
| 6,997,048 B2 | 2/2006 | Komatsu |
| 7,042,332 B2 | 5/2006 | Takamura |
| 7,123,167 B2 | 10/2006 | Staniszewski |
| 7,307,655 B1 | 12/2007 | Okamoto |
| 7,663,508 B2 | 2/2010 | Teshima |
| 7,737,866 B2 | 6/2010 | Wu |
| 7,813,844 B2 | 10/2010 | Gensler |
| 7,825,828 B2 | 11/2010 | Watanabe |
| 7,834,778 B2 | 11/2010 | Browne |
| 7,847,709 B2 | 12/2010 | McCall |
| 7,850,078 B2 | 12/2010 | Christenson |
| 7,924,483 B2 | 4/2011 | Smith |
| 8,035,503 B2 | 10/2011 | Partin |
| 8,054,169 B2 | 11/2011 | Bettecken |
| 8,098,146 B2 | 1/2012 | Petrucelli |
| 8,126,450 B2 | 2/2012 | Howarter |
| 8,164,628 B2 | 4/2012 | Stein |
| 8,180,524 B2 | 5/2012 | Eguchi |
| 8,180,547 B2 | 5/2012 | Prasad |
| 8,224,313 B2 | 7/2012 | Howarter |
| 8,229,645 B2 | 7/2012 | Lee |
| 8,242,884 B2 | 8/2012 | Holcomb |
| 8,335,598 B2 | 12/2012 | Dickerhoof |
| 8,401,235 B2 | 3/2013 | Lee |
| 8,493,236 B2 | 7/2013 | Boehme |
| 8,538,408 B2 | 9/2013 | Howarter |
| 8,542,130 B2 | 9/2013 | Lavoie |
| 8,552,856 B2 | 10/2013 | McRae |
| 8,587,681 B2 | 11/2013 | Guidash |
| 8,594,616 B2 | 11/2013 | Gusikhin |
| 8,599,043 B2 | 12/2013 | Kadowaki |
| 8,618,945 B2 | 12/2013 | Furuta |
| 8,645,015 B2 | 2/2014 | Oetiker |
| 8,655,551 B2 | 2/2014 | Danz |
| 8,692,773 B2 * | 4/2014 | You .................. H04M 1/23 345/168 |
| 8,706,350 B2 | 4/2014 | Talty |
| 8,725,315 B2 | 5/2014 | Talty |
| 8,742,947 B2 | 6/2014 | Nakazono |
| 8,744,684 B2 | 6/2014 | Hong |
| 8,780,257 B2 | 7/2014 | Gidon |
| 8,787,868 B2 | 7/2014 | Leblanc |
| 8,825,262 B2 | 9/2014 | Lee |
| 8,933,778 B2 | 1/2015 | Birkel |
| 8,957,786 B2 | 2/2015 | Stempnik |
| 8,994,548 B2 | 3/2015 | Gaboury |
| 8,995,914 B2 | 3/2015 | Nishidai |
| 9,008,860 B2 | 4/2015 | Waldock |
| 9,014,920 B1 | 4/2015 | Torres |
| 9,078,200 B2 | 7/2015 | Wuergler |
| 9,086,879 B2 | 7/2015 | Gautama |
| 9,141,503 B1 | 9/2015 | Chen |
| 9,147,065 B2 | 9/2015 | Lauer |
| 9,154,920 B2 | 10/2015 | O'Brien |
| 9,168,955 B2 | 10/2015 | Noh |
| 9,193,387 B2 | 11/2015 | Auer |
| 9,225,531 B2 | 12/2015 | Hachey |
| 9,230,439 B2 | 1/2016 | Boulay |
| 9,233,710 B2 | 1/2016 | Lavoie |
| 9,273,966 B2 | 3/2016 | Bartels |
| 9,275,208 B2 | 3/2016 | Protopapas |
| 9,283,960 B1 | 3/2016 | Lavoie |
| 9,286,803 B2 | 3/2016 | Tippelhofer |
| 9,302,675 B2 | 4/2016 | Schilling |
| 9,318,022 B2 | 4/2016 | Barth |
| 9,379,567 B2 | 6/2016 | Kracker |
| 9,381,859 B2 | 7/2016 | Nagata |
| 9,429,657 B2 | 8/2016 | Sidhu |
| 9,429,947 B1 | 8/2016 | Wengreen |
| 9,454,251 B1 | 9/2016 | Guihot |
| 9,469,247 B2 | 10/2016 | Juneja |
| 9,493,187 B2 | 11/2016 | Pilutti |
| 9,506,774 B2 | 11/2016 | Shutko |
| 9,511,799 B2 | 12/2016 | Lavoie |
| 9,522,675 B1 | 12/2016 | You |
| 9,529,519 B2 | 12/2016 | Blumenberg |
| 9,557,741 B1 | 1/2017 | Elie |
| 9,563,990 B2 | 2/2017 | Khan |
| 9,595,145 B2 | 3/2017 | Avery |
| 9,598,051 B2 | 3/2017 | Okada |
| 9,606,241 B2 | 3/2017 | Varoglu |
| 9,616,923 B2 | 4/2017 | Lavoie |
| 9,637,117 B1 | 5/2017 | Gusikhin |
| 9,651,655 B2 | 5/2017 | Feldman |
| 9,656,690 B2 | 5/2017 | Shen |
| 9,666,040 B2 | 5/2017 | Flaherty |
| 9,688,306 B2 | 6/2017 | McClain |
| 9,701,280 B2 | 7/2017 | Schussmann |
| 9,712,977 B2 | 7/2017 | Tu |
| 9,715,816 B1 | 7/2017 | Adler |
| 9,725,069 B2 | 8/2017 | Krishnan |
| 9,731,714 B2 | 8/2017 | Kiriya |
| 9,731,764 B2 | 8/2017 | Baek |
| 9,754,173 B2 | 9/2017 | Kim |
| 9,809,218 B2 | 11/2017 | Elie |
| 9,811,085 B1 | 11/2017 | Hayes |
| 9,842,444 B2 | 12/2017 | Van Wiemeersch |
| 9,845,070 B2 | 12/2017 | Petel |
| 9,846,431 B2 | 12/2017 | Petel |
| 9,914,333 B2 | 3/2018 | Shank |
| 9,921,743 B2 | 3/2018 | Bryant et al. |
| 9,946,255 B2 | 4/2018 | Matters |
| 9,959,763 B2 | 5/2018 | Miller |
| 9,971,130 B1 | 5/2018 | Lin |
| 9,975,504 B2 | 5/2018 | Dalke |
| 9,986,063 B2 | 5/2018 | Muramoto |
| 10,019,001 B2 | 7/2018 | Dang Van Nhan |
| 10,032,276 B1 | 7/2018 | Liu |
| 10,040,482 B1 | 8/2018 | Jung |
| 10,043,076 B1 | 8/2018 | Zhang |
| 10,131,347 B2 | 11/2018 | Kim |
| 10,192,113 B1 | 1/2019 | Liu |
| 10,246,055 B2 | 4/2019 | Farges |
| 10,268,341 B2 | 4/2019 | Kocienda |
| 10,372,121 B2 * | 8/2019 | Whitaker .............. B60W 10/18 |
| 2003/0060972 A1 | 3/2003 | Kakinami |
| 2003/0098792 A1 | 5/2003 | Edwards |
| 2003/0133027 A1 | 7/2003 | Itoh |
| 2005/0030156 A1 | 2/2005 | Alfonso |
| 2005/0068450 A1 | 3/2005 | Steinberg |
| 2005/0099275 A1 | 5/2005 | Kamdar |
| 2006/0010961 A1 | 1/2006 | Gibson |
| 2006/0227010 A1 | 10/2006 | Berstis |
| 2006/0235590 A1 | 10/2006 | Bolourchi |
| 2007/0230944 A1 | 10/2007 | Georgiev |
| 2008/0027591 A1 | 1/2008 | Lenser |
| 2008/0154464 A1 | 6/2008 | Sasajima |
| 2008/0154613 A1 | 6/2008 | Haulick |
| 2008/0238643 A1 | 10/2008 | Malen |
| 2008/0306683 A1 | 12/2008 | Ando |
| 2009/0096753 A1 | 4/2009 | Lim |
| 2009/0098907 A1 | 4/2009 | Huntzicker |
| 2009/0115639 A1 | 5/2009 | Proefke |
| 2009/0125181 A1 | 5/2009 | Luke |
| 2009/0125311 A1 | 5/2009 | Haulick |
| 2009/0128315 A1 | 5/2009 | Griesser |
| 2009/0146813 A1 | 6/2009 | Nuno |
| 2009/0174574 A1 | 7/2009 | Endo |
| 2009/0241031 A1 | 9/2009 | Gamaley |
| 2009/0289813 A1 | 11/2009 | Kwiecinski |
| 2009/0309970 A1 | 12/2009 | Ishii |
| 2009/0313095 A1 | 12/2009 | Hurpin |
| 2010/0025942 A1 | 2/2010 | Mangaroo |
| 2010/0061564 A1 | 3/2010 | Clemow |
| 2010/0114471 A1 | 5/2010 | Sugiyama |
| 2010/0114488 A1 | 5/2010 | Khamharn |
| 2010/0136944 A1 | 6/2010 | Taylor |
| 2010/0152972 A1 | 6/2010 | Attard |
| 2010/0156672 A1 | 6/2010 | Yoo |

(56) References Cited

U.S. PATENT DOCUMENTS

| | | |
|---|---|---|
| 2010/0245277 A1 | 9/2010 | Nakao |
| 2010/0259420 A1 | 10/2010 | Von Reyher |
| 2011/0071725 A1 | 3/2011 | Kleve |
| 2011/0082613 A1 | 4/2011 | Oetiker |
| 2011/0190972 A1 | 8/2011 | Timmons |
| 2011/0205088 A1 | 8/2011 | Baker |
| 2011/0227757 A1 | 9/2011 | Chen |
| 2011/0253463 A1 | 10/2011 | Smith |
| 2011/0309922 A1 | 12/2011 | Ghabra |
| 2012/0007741 A1 | 1/2012 | Laffey |
| 2012/0072067 A1 | 3/2012 | Jecker |
| 2012/0083960 A1 | 4/2012 | Zhu |
| 2012/0173080 A1 | 7/2012 | Cluff |
| 2012/0176332 A1 | 7/2012 | Fujibayashi |
| 2012/0271500 A1 | 10/2012 | Tsimhoni |
| 2012/0303258 A1 | 11/2012 | Pampus |
| 2012/0323643 A1 | 12/2012 | Volz |
| 2012/0323700 A1 | 12/2012 | Aleksandrovich |
| 2013/0021171 A1 | 1/2013 | Hsu |
| 2013/0024202 A1 | 1/2013 | Harris |
| 2013/0043989 A1 | 2/2013 | Niemz |
| 2013/0073119 A1 | 3/2013 | Huger |
| 2013/0109342 A1 | 5/2013 | Welch |
| 2013/0110342 A1 | 5/2013 | Wuttke |
| 2013/0113936 A1 | 5/2013 | Cohen |
| 2013/0124061 A1 | 5/2013 | Khanafer |
| 2013/0145441 A1 | 6/2013 | Mujumdar |
| 2013/0211623 A1 | 8/2013 | Thompson |
| 2013/0231824 A1 | 9/2013 | Wilson |
| 2013/0289825 A1 | 10/2013 | Noh |
| 2013/0314502 A1 | 11/2013 | Urbach |
| 2013/0317944 A1 | 11/2013 | Huang |
| 2014/0052323 A1 | 2/2014 | Reichel |
| 2014/0095994 A1 | 4/2014 | Kim |
| 2014/0096051 A1 | 4/2014 | Boblett |
| 2014/0121930 A1 | 5/2014 | Allexi |
| 2014/0147032 A1 | 5/2014 | Yous |
| 2014/0156107 A1 | 6/2014 | Karasawa |
| 2014/0188339 A1 | 7/2014 | Moon |
| 2014/0222252 A1 | 8/2014 | Matters |
| 2014/0240502 A1 | 8/2014 | Strauss |
| 2014/0282931 A1 | 9/2014 | Protopapas |
| 2014/0297120 A1 | 10/2014 | Cotgrove |
| 2014/0300504 A1 | 10/2014 | Shaffer |
| 2014/0303839 A1 | 10/2014 | Filev |
| 2014/0320318 A1 | 10/2014 | Victor |
| 2014/0327736 A1 | 11/2014 | DeJohn |
| 2014/0350804 A1 | 11/2014 | Park |
| 2014/0350855 A1 | 11/2014 | Vishnuvajhala |
| 2014/0365108 A1 | 12/2014 | You |
| 2014/0365126 A1 | 12/2014 | Vulcano |
| 2015/0022468 A1 | 1/2015 | Cha |
| 2015/0039173 A1 | 2/2015 | Beaurepaire |
| 2015/0039224 A1 | 2/2015 | Tuukkanen |
| 2015/0048927 A1 | 2/2015 | Simmons |
| 2015/0066545 A1 | 3/2015 | Kotecha |
| 2015/0077522 A1 | 3/2015 | Suzuki |
| 2015/0088360 A1 | 3/2015 | Bonnet |
| 2015/0091741 A1 | 4/2015 | Stefik |
| 2015/0109116 A1 | 4/2015 | Grimm |
| 2015/0116079 A1 | 4/2015 | Mishra |
| 2015/0123818 A1 | 5/2015 | Sellschopp |
| 2015/0127208 A1 | 5/2015 | Jecker |
| 2015/0149265 A1 | 5/2015 | Huntzicker |
| 2015/0151789 A1 | 6/2015 | Lee |
| 2015/0153178 A1 | 6/2015 | Koo |
| 2015/0161890 A1 | 6/2015 | Huntzicker |
| 2015/0163649 A1 | 6/2015 | Chen |
| 2015/0197278 A1 | 7/2015 | Boos |
| 2015/0203111 A1 | 7/2015 | Bonnet |
| 2015/0203156 A1 | 7/2015 | Hafner |
| 2015/0210317 A1 | 7/2015 | Hafner |
| 2015/0217693 A1 | 8/2015 | Pliefke |
| 2015/0219464 A1 | 8/2015 | Beaurepaire |
| 2015/0220791 A1 | 8/2015 | Wu |
| 2015/0226146 A1 | 8/2015 | Elwart |
| 2015/0274016 A1 | 10/2015 | Kinoshita |
| 2015/0286340 A1 | 10/2015 | Send |
| 2015/0329110 A1 | 11/2015 | Stefan |
| 2015/0344028 A1 | 12/2015 | Gieseke |
| 2015/0346727 A1 | 12/2015 | Ramanujam |
| 2015/0360720 A1 | 12/2015 | Li |
| 2015/0365401 A1 | 12/2015 | Brown |
| 2015/0371541 A1 | 12/2015 | Korman |
| 2015/0375741 A1 | 12/2015 | Kiriya |
| 2015/0375742 A1 | 12/2015 | Gebert |
| 2016/0012653 A1 | 1/2016 | Soroka |
| 2016/0012726 A1 | 1/2016 | Wang |
| 2016/0018821 A1 | 1/2016 | Akita |
| 2016/0055749 A1 | 2/2016 | Nicoll |
| 2016/0153778 A1 | 2/2016 | Singh |
| 2016/0062354 A1 | 3/2016 | Li |
| 2016/0068158 A1 | 3/2016 | Elwart |
| 2016/0068187 A1 | 3/2016 | Hata |
| 2016/0075369 A1 | 3/2016 | Lavoie |
| 2016/0090055 A1 | 3/2016 | Breed |
| 2016/0107689 A1 | 4/2016 | Lee |
| 2016/0112846 A1 | 4/2016 | Siswick |
| 2016/0114726 A1 | 4/2016 | Nagata |
| 2016/0117926 A1 | 4/2016 | Akavaram |
| 2016/0127664 A1 | 5/2016 | Bruder |
| 2016/0139244 A1 | 5/2016 | Holtman |
| 2016/0144857 A1 | 5/2016 | Ohshima |
| 2016/0152263 A1 | 6/2016 | Singh |
| 2016/0170494 A1 | 6/2016 | Bonnet |
| 2016/0185389 A1 | 6/2016 | Ishijima |
| 2016/0189435 A1 | 6/2016 | Beaurepaire |
| 2016/0207528 A1 | 7/2016 | Stefan |
| 2016/0224025 A1 | 8/2016 | Petel |
| 2016/0229452 A1 | 8/2016 | Lavoie |
| 2016/0236680 A1 | 8/2016 | Lavoie |
| 2016/0249294 A1 | 8/2016 | Lee |
| 2016/0257304 A1 | 9/2016 | Lavoie |
| 2016/0272244 A1 | 9/2016 | Imai |
| 2016/0282442 A1 | 9/2016 | O'Mahony |
| 2016/0284217 A1 | 9/2016 | Lee |
| 2016/0288657 A1 | 10/2016 | Tokura |
| 2016/0300417 A1 | 10/2016 | Hatton |
| 2016/0304087 A1 | 10/2016 | Noh |
| 2016/0304088 A1 | 10/2016 | Barth |
| 2016/0349362 A1 | 10/2016 | Rohr |
| 2016/0321445 A1 | 11/2016 | Turgeman |
| 2016/0321926 A1 | 11/2016 | Mayer |
| 2016/0334797 A1 | 11/2016 | Ross |
| 2016/0347280 A1 | 12/2016 | Daman |
| 2016/0355125 A1 | 12/2016 | Herbert |
| 2016/0357354 A1 | 12/2016 | Chen |
| 2016/0358474 A1 | 12/2016 | Uppal |
| 2016/0368489 A1 | 12/2016 | Aich |
| 2016/0371607 A1 | 12/2016 | Rosen |
| 2016/0371691 A1 | 12/2016 | Kang |
| 2017/0001650 A1 | 1/2017 | Park |
| 2017/0008563 A1 | 1/2017 | Popken |
| 2017/0026198 A1 | 1/2017 | Ochiai |
| 2017/0028985 A1 | 2/2017 | Kiyokawa |
| 2017/0030722 A1 | 2/2017 | Kojo |
| 2017/0032593 A1 | 2/2017 | Patel |
| 2017/0052625 A1* | 2/2017 | Bryant ............... G06F 3/04883 |
| 2017/0072947 A1 | 3/2017 | Lavoie |
| 2017/0073004 A1 | 3/2017 | Shepard |
| 2017/0076603 A1 | 3/2017 | Bostick |
| 2017/0097504 A1 | 4/2017 | Takamatsu |
| 2017/0116790 A1 | 4/2017 | Kusens |
| 2017/0123423 A1 | 5/2017 | Sako |
| 2017/0129537 A1 | 5/2017 | Kim |
| 2017/0129538 A1 | 5/2017 | Stefan |
| 2017/0132482 A1 | 5/2017 | Kim |
| 2017/0144654 A1 | 5/2017 | Sham |
| 2017/0144656 A1 | 5/2017 | Kim |
| 2017/0147995 A1 | 5/2017 | Kalimi |
| 2017/0168479 A1 | 6/2017 | Dang |
| 2017/0192428 A1 | 7/2017 | Vogt |
| 2017/0200369 A1 | 7/2017 | Miller |
| 2017/0203763 A1 | 7/2017 | Yamada |

(56) References Cited

U.S. PATENT DOCUMENTS

| | | | |
|---|---|---|---|
| 2017/0208438 A1 | 7/2017 | Dickow | |
| 2017/0297385 A1 | 10/2017 | Kim | |
| 2017/0297620 A1 | 10/2017 | Lavoie | |
| 2017/0301241 A1 | 10/2017 | Urhahne | |
| 2017/0308075 A1 | 10/2017 | Whitaker et al. | |
| 2017/0336788 A1 | 11/2017 | Iagnemma | |
| 2017/0357317 A1 | 12/2017 | Chaudhri | |
| 2017/0371514 A1 | 12/2017 | Cullin | |
| 2018/0015878 A1 | 1/2018 | McNew | |
| 2018/0024559 A1 | 1/2018 | Seo | |
| 2018/0029591 A1 | 2/2018 | Lavoie | |
| 2018/0029641 A1 | 2/2018 | Solar | |
| 2018/0032788 A1* | 2/2018 | Krenzer | G06K 9/00006 |
| 2018/0039264 A1 | 2/2018 | Messner | |
| 2018/0043884 A1 | 2/2018 | Johnson | |
| 2018/0056939 A1 | 3/2018 | van Roermund | |
| 2018/0056989 A1 | 3/2018 | Donald | |
| 2018/0082588 A1 | 3/2018 | Hoffman, Jr. | |
| 2018/0088330 A1 | 3/2018 | Giannuzzi | |
| 2018/0093663 A1 | 4/2018 | Kim | |
| 2018/0105165 A1 | 4/2018 | Alarcon | |
| 2018/0105167 A1 | 4/2018 | Kim | |
| 2018/0148094 A1 | 5/2018 | Mukaiyama | |
| 2018/0174460 A1 | 6/2018 | Jung | |
| 2018/0189971 A1 | 7/2018 | Hildreth | |
| 2018/0194344 A1 | 7/2018 | Wang | |
| 2018/0196963 A1 | 7/2018 | Bandiwdekar | |
| 2018/0224863 A1 | 8/2018 | Fu | |
| 2018/0236957 A1 | 8/2018 | Min | |
| 2018/0284802 A1 | 10/2018 | Tsai | |
| 2018/0286072 A1 | 10/2018 | Tsai | |
| 2018/0339654 A1 | 11/2018 | Kim | |
| 2018/0345851 A1 | 12/2018 | Lavoie | |
| 2018/0364731 A1 | 12/2018 | Liu | |
| 2019/0005445 A1 | 1/2019 | Bahrainwala | |
| 2019/0042003 A1 | 2/2019 | Parazynski | |
| 2019/0066503 A1 | 2/2019 | Li | |
| 2019/0103027 A1 | 4/2019 | Wheeler | |
| 2019/0137990 A1 | 5/2019 | Golgiri | |

FOREIGN PATENT DOCUMENTS

| | | |
|---|---|---|
| CN | 104183153 A | 12/2014 |
| CN | 104485013 A | 4/2015 |
| CN | 104691544 A | 6/2015 |
| CN | 103049159 B | 7/2015 |
| CN | 105513412 A | 4/2016 |
| CN | 105588563 A | 5/2016 |
| CN | 105599703 A | 5/2016 |
| CN | 105774691 A | 7/2016 |
| CN | 106027749 A | 10/2016 |
| CN | 205719000 U | 11/2016 |
| CN | 106598630 A | 4/2017 |
| CN | 106782572 A | 5/2017 |
| CN | 106945662 A | 7/2017 |
| CN | 107369319 A | 11/2017 |
| CN | 107508855 A | 12/2017 |
| CN | 104290751 B | 1/2018 |
| CN | 107708090 A | 2/2018 |
| DE | 3844340 A1 | 7/1990 |
| DE | 19817142 A1 | 10/1999 |
| DE | 19821163 A1 | 11/1999 |
| DE | 102005006966 A1 | 9/2005 |
| DE | 102006058213 A1 | 7/2008 |
| DE | 102009024083 A1 | 7/2010 |
| DE | 102016224529 A1 | 3/2011 |
| DE | 102016226008 A1 | 3/2011 |
| DE | 102010034129 B4 | 2/2012 |
| DE | 102009060169 A1 | 6/2013 |
| DE | 102011080148 A1 | 7/2013 |
| DE | 102012200725 A1 | 9/2013 |
| DE | 102009051055 A1 | 10/2013 |
| DE | 102011122421 A1 | 6/2014 |
| DE | 102012008858 A1 | 6/2014 |
| DE | 102013016342 A1 | 1/2015 |
| DE | 102013019904 A1 | 2/2015 |
| DE | 102012215218 A1 | 4/2015 |
| DE | 102012222972 A1 | 5/2015 |
| DE | 102013004214 A1 | 5/2015 |
| DE | 102013019771 A1 | 12/2015 |
| DE | 102013213064 A1 | 2/2016 |
| DE | 102014007915 A1 | 2/2016 |
| DE | 102014011802 A1 | 2/2016 |
| DE | 102014009077 A1 | 4/2016 |
| DE | 102014226458 A1 | 6/2016 |
| DE | 102014011864 A1 | 12/2016 |
| DE | 102014015655 A1 | 5/2017 |
| DE | 102014111570 A1 | 6/2017 |
| DE | 102016214433 A1 | 6/2017 |
| DE | 102015209976 A1 | 7/2017 |
| DE | 102015221224 A1 | 12/2017 |
| DE | 102016011916 A1 | 2/2018 |
| DE | 102016125282 A1 | 6/2018 |
| DE | 102016211021 A1 | 6/2018 |
| EP | 2653367 A1 | 6/2000 |
| EP | 2768718 B1 | 6/2011 |
| EP | 2289768 A2 | 10/2013 |
| EP | 2620351 B1 | 12/2015 |
| EP | 2295281 A1 | 3/2016 |
| EP | 2135788 B1 | 6/2016 |
| FR | 3021798 A1 | 12/2012 |
| GB | 2534471 A | 10/2000 |
| GB | 2344481 A | 12/2012 |
| GB | 2497836 A | 9/2014 |
| GB | 2481324 A | 3/2015 |
| GB | 2517835 A | 5/2016 |
| GB | 2491720 A | 7/2016 |
| JP | 5918683 B2 | 10/2004 |
| JP | 2000293797 A | 7/2005 |
| JP | 2004142543 A | 4/2009 |
| JP | 2016119032 A | 4/2009 |
| JP | 2018052188 A | 1/2010 |
| JP | 2004287884 A | 7/2014 |
| JP | 2005193742 A | 7/2014 |
| JP | 5586450 B2 | 9/2014 |
| JP | 2009090850 A | 6/2016 |
| JP | 2014134082 A | 7/2016 |
| JP | 2014125196 A | 4/2018 |
| KR | 20130106005 A | 6/2006 |
| KR | 20160039460 A | 5/2008 |
| KR | 20160051993 A | 1/2010 |
| KR | 101641267 B | 9/2013 |
| KR | 20090040024 A | 4/2016 |
| KR | 20100006714 A | 5/2016 |
| WO | WO 2017/112444 A1 | 12/2010 |
| WO | WO 2017/118510 A1 | 6/2011 |
| WO | WO 2006/064544 A1 | 11/2011 |
| WO | WO 2017/125514 A1 | 1/2013 |
| WO | WO 2008/055567 A1 | 4/2013 |
| WO | WO 2010/006981 A1 | 8/2013 |
| WO | WO 2013123813 A1 | 8/2013 |
| WO | WO 2011/141096 A1 | 7/2014 |
| WO | WO 2013/056959 A1 | 5/2015 |
| WO | WO 2014/103492 A1 | 3/2016 |
| WO | WO 2015/068032 A1 | 8/2016 |
| WO | WO 2015/193058 A1 | 9/2016 |
| WO | WO-2016179907 A1 * | 11/2016 ............ B62D 15/02 |
| WO | WO 2016/046269 A1 | 4/2017 |
| WO | WO 2016/128200 A1 | 5/2017 |
| WO | WO 2016/134822 A1 | 6/2017 |
| WO | WO 2017/062448 A1 | 6/2017 |
| WO | WO 2017/073159 A1 | 6/2017 |
| WO | WO 2017/096307 A1 | 6/2017 |
| WO | WO 2017/096728 A1 | 7/2017 |
| WO | WO 2017/097942 A1 | 7/2017 |

OTHER PUBLICATIONS

Daimler, "Remote Parking with the smartphone app", 2015, Global Media Site (Year: 2015).*

Lucas Wang et al., Data Naming in Vehicle-to-Vehicle Communications, 2012, 6 pages.

(56) References Cited

OTHER PUBLICATIONS

Sasirom Tiennoy et al., Using a Distributed Roadside Unit for the Data Dissemination Protocol in Vanet With the Named Data Architecture, 2018, 12 pages.
Alberto Broggi and Elena Cardarelli, Vehicle Detection for Autonomous Parking Using a Soft-Cascade ADA Boost Classifier, Jun. 8, 2014.
Al-Sherbaz, Ali et al., Hybridisation of GNSS with other wireless/sensors technologies on board smartphones to offer seamless outdoors-indoors positioning for LBS applications, Apr. 2016, 3 pages.
Automatically Into the Parking Space—https://www.mercedes-benz.com/en/mercedes-benz/next/automation/automatically-into-the-parking-space/; Oct. 27, 2014.
Bill Howard, Bosch's View of The Future Car: Truly Keyless Entry, Haptic Feedback, Smart Parking, Cybersecurity, Jan. 9, 2017, 8 Pages.
ChargeItSpot Locations, Find a Phone Charging Station Near You, retrieved at https://chargeitspot.com/locations/ on Nov. 28, 2017.
Core System Requirements Specification (SyRS), Jun. 30, 2011, Research and Innovative Technology Administration.
Daimler AG, Remote Parking Pilot, Mar. 2016 (3 Pages).
Jingbin Liu, IParking: An Intelligent Indoor Location-Based Smartphone Parking Service, Oct. 31, 2012, 15 pages.
Land Rover develops a smartphone remote control for its SUVs, James Vincent, Jun. 18, 2015.
Land Rover, Land Rover Remote Control Via Iphone Rc Range Rover Sport Showcase—Autogefühl, Retrieved from https://www.youtube.com/watch?v=4ZaaYNaEFio (at 43 seconds and 1 minute 42 seconds), Sep. 16, 2015.
Perpendicular Parking—https://prezi.com/toqmfyxriksl/perpendicular-parking/.
Safecharge, Secure Cell Phone Charging Stations & Lockers, retrieved at https://www.thesafecharge.com on Nov. 28, 2017.
Search Report dated Jan. 19, 2018 for GB Patent Application No. 1711988.4 (3 pages).
Search Report dated Jul. 11, 2017 for GB Patent Application No. 1700447.4 (3 Pages).
Search Report dated May 21, 2018 for Great Britain Patent Application No. GB 1800277.4 (5 Pages).
Search Report dated Nov. 22, 2018 for GB Patent Application No. GB 1809829.3 (6 pages).
Search Report dated Nov. 27, 2018 for GB Patent Application No. GB 1809112.4 (3 pages).
Search Report dated Nov. 28, 2017, for GB Patent Application No. GB 1710916.6 (4 Pages).
Search Report dated Nov. 28, 2018 for GB Patent Application No. GB 1809842.6 (5 pages).
Search Report dated Oct. 10, 2018 for GB Patent Application No. 1806499.8 (4 pages).
Tesla Model S Owner's Manual V2018.44. Oct. 29, 2018.

\* cited by examiner

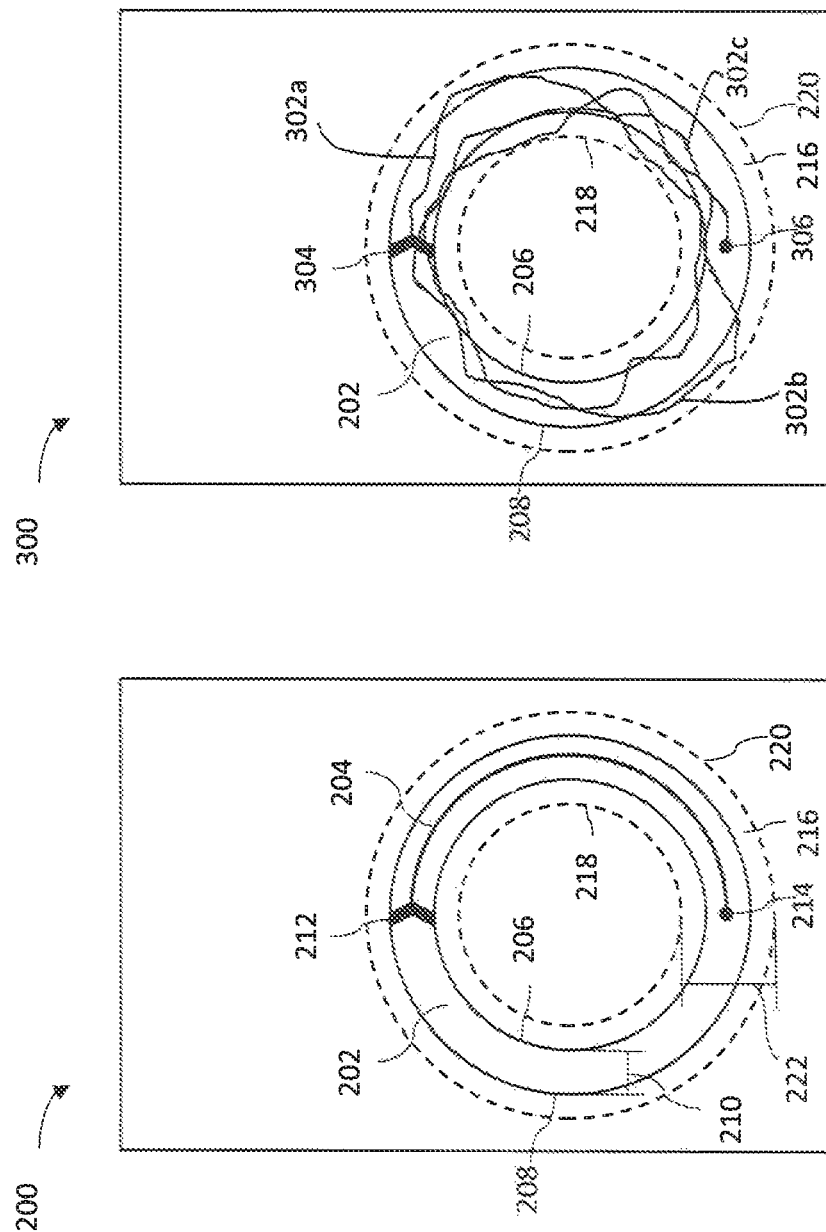

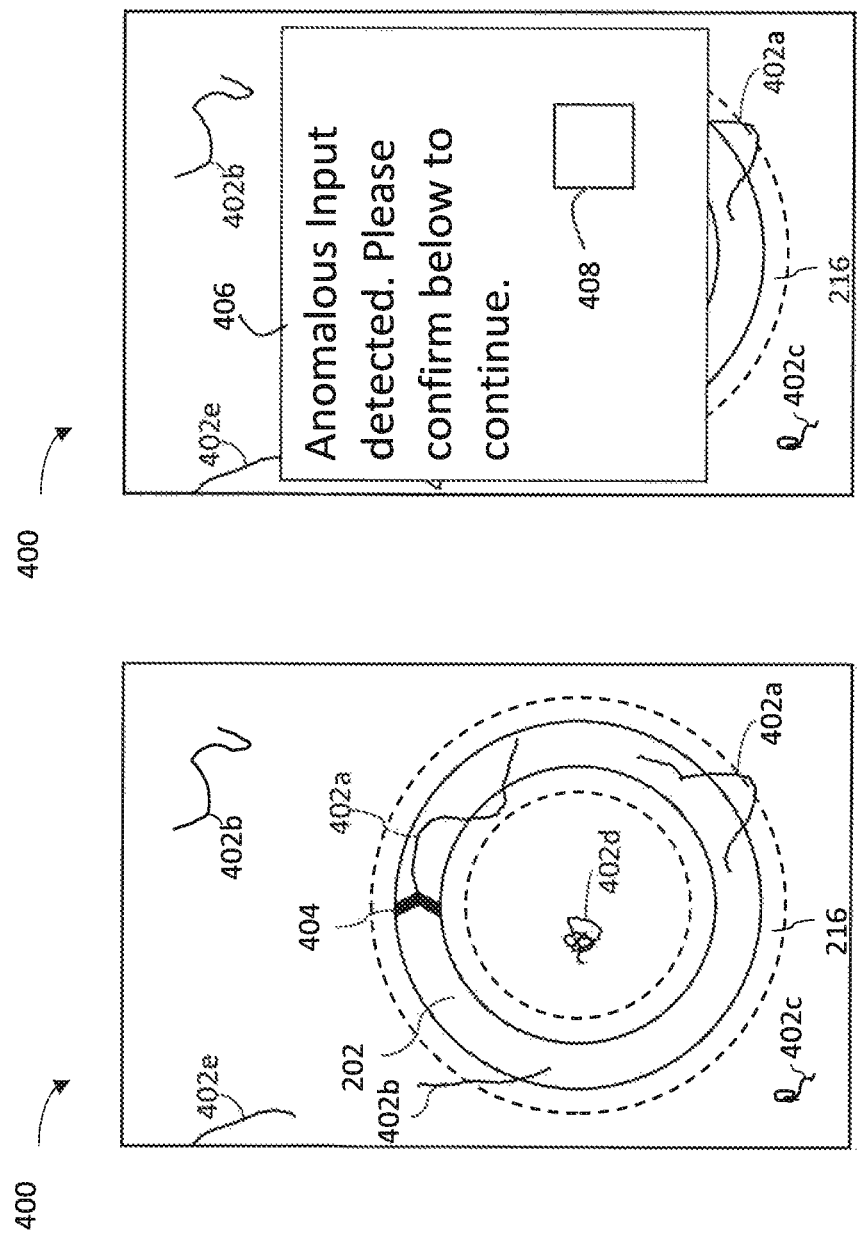

ANOMALOUS INPUT DETECTION

TECHNICAL FIELD

The present disclosure generally relates to remote park-assist and, more specifically, input verification for vehicle remote park-assist.

BACKGROUND

Many vehicles include functions in which at least some motive functions of a vehicle are autonomously controlled by the vehicle. For example, some vehicles include cruise control in which the vehicle controls acceleration and/or deceleration of the vehicle so that a speed of the vehicle is maintained. Some vehicles also include adaptive cruise control in which the vehicle controls acceleration and/or deceleration of the vehicle so that a speed of the vehicle is maintained while also maintaining a predetermined following distance from other vehicles ahead. Further, some vehicles include park-assist features in which the vehicle autonomously controls motive functions of the vehicle to park the vehicle into a parking spot.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for input verification for vehicle remote park-assist. An example disclosed vehicle system includes a mobile device including a touchscreen configured to present an interface of a remote parking app. The touchscreen receives an input responsive to the remote parking app. The vehicle system further includes a vehicle autonomy unit communicably coupled to the mobile device to receive an input signal which corresponds with the received input. An input classifier is coupled to the vehicle autonomy unit and the input classifier verifies the received input signal complies with an input classification. The vehicle autonomy unit sends a notification to the mobile device if the received input signal is non-compliant with the input classification.

An example disclosed method for verifying inputs for remote parking of vehicles includes presenting, via a touchscreen of a mobile device, an interface of a remote parking app. The method further includes receiving an input at a controller of the mobile device via the touchscreen responsive to presenting the interface. The method further includes receiving, via a vehicle autonomy unit, an input signal send by the mobile device and verifying, by an input classifier, the received input signal complies with an input classification. The method further includes sending, via the vehicle autonomy unit, a notification to the mobile device if the received input signal is non-compliant with the input classification.

An example disclosed tangible computer readable medium includes instructions which, when executed, cause a machine to present, via a touchscreen of a mobile device, an interface of a remote parking app. The instructions which, when executed, also cause the machine to receive an input at a controller via the touchscreen responsive to presenting the interface. The instructions, when executed, further cause the machine to receive, by a vehicle autonomy unit, an input signal sent by the mobile device, verify, by an input classifier, the received input signal complies with an input classification, and send, via the vehicle autonomy unit, a notification to the mobile device if the received input signal is non-compliant with the input classification.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

FIG. 2 illustrates an example remote park-assist interface presented via the mobile device of FIG. 1.

FIG. 3 illustrates another example remote park-assist interface presented via the mobile device of FIG. 1.

FIG. 4A illustrates another example remote park-assist interface presented via the mobile device of FIG. 1.

FIG. 4B illustrates another example remote park-assist interface presented via the mobile device of FIG. 1.

DETAILED DESCRIPTION OF EXAMPLE EMBODIMENTS

Figure 1:
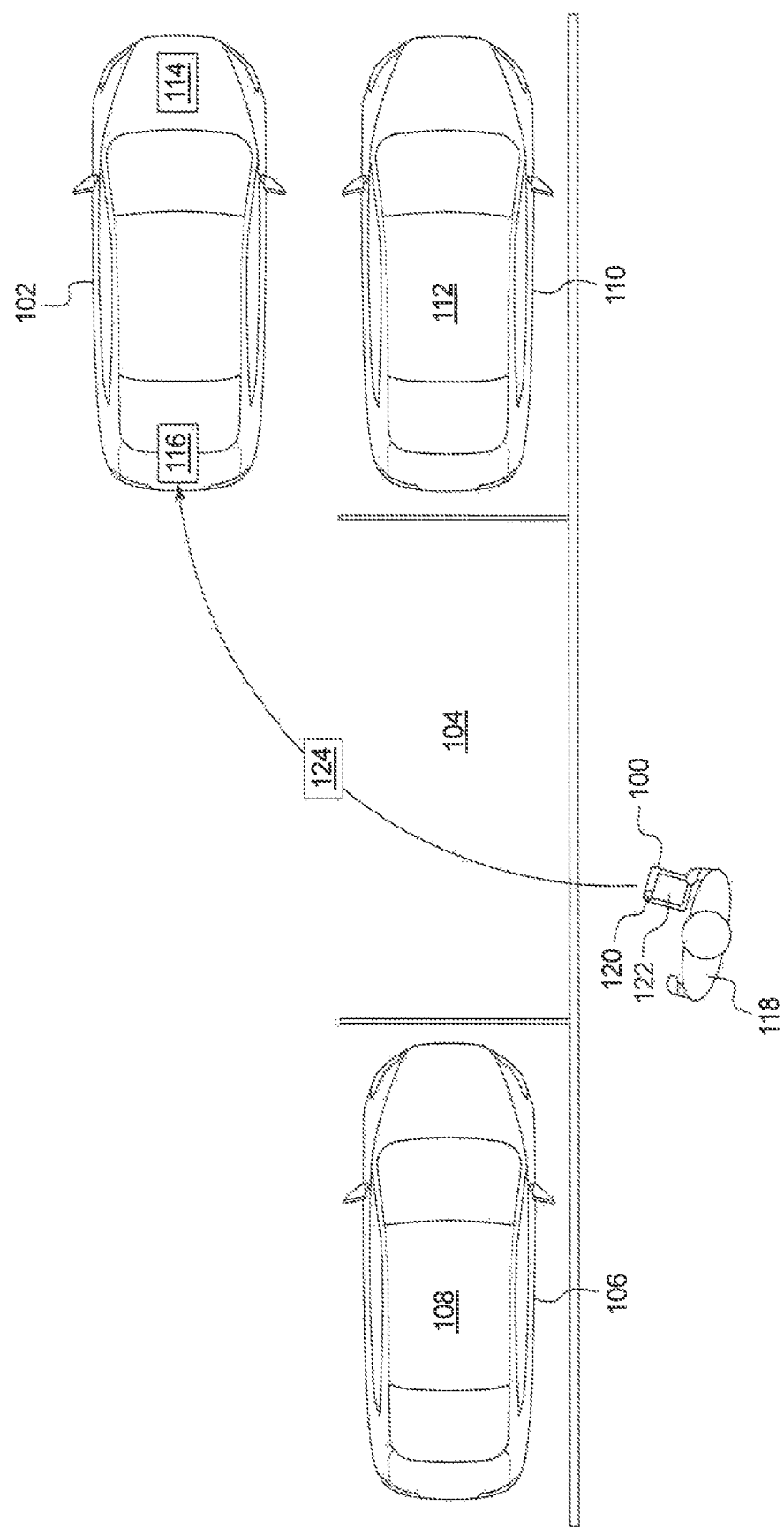
FIG. 1 illustrates an example mobile device utilized for remote parking of an example vehicle in accordance with the teachings herein.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Many vehicles include functions in which at least some motive functions of a vehicle are autonomously controlled by the vehicle. For example, some vehicles include cruise control in which the vehicle controls acceleration and/or deceleration of the vehicle so that a speed of the vehicle is maintained. Some vehicles also include adaptive cruise control in which the vehicle controls acceleration and/or deceleration of the vehicle so that a speed of the vehicle is maintained while also maintaining a predetermined following distance from other vehicles ahead.

Further, some vehicles include park-assist features (e.g., a remote park-assist feature) in which the vehicle autonomously controls motive functions of the vehicle to park the vehicle into a parking spot. A remote park-assist feature autonomously parks a vehicle when a driver of the vehicle has already exited the vehicle. For example, the driver may position the vehicle near a parking spot, exit the vehicle, and remotely instruct the vehicle (e.g., via a pushing a button or performing a prescribed action on a key fob or mobile device) to autonomously park in the parking spot. A driver may utilize remote parking to park a vehicle in a parking spot in which a driver would subsequently be unable to exit a cabin of the vehicle (e.g., due to a nearby vehicle, wall, or other structure).

The example apparatus, methods, and machine readable media include a remote park-assist system for initiating autonomous parking of a vehicle into parking spot. A mobile device enables a driver to initiate autonomous parking movement while the driver is located outside of the vehicle. As used herein, "remote parking" and "remote park-assist" refer to a vehicle controlling motive functions of the vehicle without direct steering or velocity input from a driver to autonomously park the vehicle into a parking spot while the driver is located outside of the vehicle. For example, a remote park assist-system enables an autonomy unit to control the motive functions of the vehicle to remotely park the vehicle into the parking spot upon initiation from the driver.

The driver moves his or her finger along a touchscreen (e.g., capacitive, resistive) of the mobile device to initiate the autonomous parking movement. The remote park-assist system detects whether the touchscreen has received an input consistent with the initiation of the autonomous parking movement. The remote-park assist system includes detection of nominal inputs and anomalous inputs received via the touch screen of the mobile device. The remote-park assist system further analyzes the detected input to determine whether the input is consistent with the autonomous parking movement while controlling functions of a vehicle via the mobile device. In some examples, the remote-park assist system includes an input classifier that utilizes a machine learning algorithm to determine, as a binary classification, whether a received input was a nominal input (e.g., an intended input) or an anomalous input (e.g., an unintended input). If the input classifier determines the input is an anomalous input, the remote park-assist system presents a notification via the touchscreen. In certain embodiments, the notification includes an acknowledgement checkbox via the touchscreen and the remote park-assist system subsequently pauses and/or stops performance of the vehicle functions until the acknowledgement checkbox is selected. Additionally, in certain embodiments, the input classifier detects a source of the anomalous inputs, and the remote park-assist system identifies the source and the notification includes presenting the source of the anomalous input.

Turning to the figures, FIG. 1 illustrates an example mobile device 100 that is utilized for remote parking an example vehicle 102 in accordance with the teachings herein. The vehicle 102 may be a standard gasoline powered vehicle, a hybrid vehicle, an electric vehicle, a fuel cell vehicle, and/or any other mobility implement type of vehicle. The vehicle 102 includes parts related to mobility, such as a powertrain with an engine, a transmission, a suspension, a driveshaft, wheels, etc. The vehicle 102 may be semi-autonomous (e.g., some routine motive functions controlled by the vehicle 102) or autonomous (e.g., motive functions are controlled by the vehicle 102 without direct driver input).

As illustrated in FIG. 1, the vehicle 102 is positioned to be remotely parked in an available parking spot 104. The available parking spot 104 is positioned between an occupied parking spot 106 (e.g., a first occupied parking spot) that is occupied by a parked vehicle 108 (e.g., a first parked vehicle) and another occupied parking spot 110 (e.g., a second occupied parking spot) by another parked vehicle 112 (e.g., a second parked vehicle). In the illustrated example, the available parking spot 104 is a parallel parking spot. In other examples, the available parking spot 104 into which the vehicle 102 is to park is a perpendicular or other non-parallel parking spot. In the illustrated example, the vehicle 102 is positioned next to the occupied parking spot 110 and/or the parked vehicle 112 to enable the vehicle 102 to be parallel parked in the available parking spot 104 via remote park-assist.

The vehicle 102 of the illustrated example includes an autonomy unit 114. The autonomy unit 114 is an electronic control unit (ECU) of the vehicle 102 that autonomously controls motive functions of the vehicle 102 to remotely park the vehicle 102 in available parking spots (e.g., the available parking spot 104) and/or otherwise autonomously drives the vehicle 102. For example, the autonomy unit 114 controls the motive functions of the vehicle 102 based on data collected from sensor(s) of the vehicle 102 (e.g., sensors 704 of FIG. 7).

The vehicle 102 also includes a communication module 116 (e.g., a first communication module). For example, the communication module 116 is a short-range wireless module for wireless communication with mobile device(s) of user(s) of the vehicle 102. In the illustrated example, the communication module 116 is communicatively connected to the mobile device 100 of a user 118 of the vehicle 102. The communication module 116 includes hardware and firmware to establish a connection with the mobile device 100. In some examples, the communication module 116 implements the Bluetooth® and/or Bluetooth® Low Energy (BLE) protocols. The Bluetooth® and BLE protocols are set forth in Volume 6 of the Bluetooth® Specification 4.0 (and subsequent revisions) maintained by the Bluetooth® Special Interest Group. In other examples, the communication module 116 may use WiFi, WiMax, NFC, UWB (Ultra-Wide Band), and/or any other communication protocol that enables the communication module 116 to communicatively couple to the mobile device 100.

Prior to communicating with the mobile device 100, the communication module 116 may authenticate the mobile device 100 for communication with the communication module 116. To authenticate communication between the communication module 116 and the mobile device 100, the communication module 116 intermittently broadcasts a beacon (e.g., a low-energy beacon such as Bluetooth® low-energy (BLE) beacon). When the mobile device 100 is within a broadcast range of the communication module 116, the mobile device 100 receives the beacon and subsequently sends a key. The communication module 116 authenticates the mobile device 100 for communication module 116 upon receiving the key from the mobile device 100. In other examples, the mobile device 100 broadcasts a beacon and the communication module 116 subsequently receives the beacon to authenticate communication between the mobile device 100 and the communication module 116.

In the illustrated example, the user 118 (e.g., a driver or other occupant of the vehicle 102) utilizes the mobile device 100 (e.g., a smart phone, a smart watch, a wearable, a tablet, etc.) to initiate remote parking of the vehicle 102 into the available parking spot 104. As illustrated in FIG. 1, the mobile device 100 includes a communication module 120 and a touchscreen 122.

The communication module 120 communicatively connects with other communication modules. For example, the communication module 120 is a short-range wireless module that wirelessly connects to the communication module 116 to establish communication between the mobile device 100 and the vehicle 102. The communication module 120 includes hardware and firmware to establish a connection with the communication module 116 of the vehicle 102. In some examples, the communication module 116 implements Wi-Fi, Bluetooth® and/or Bluetooth® Low Energy (BLE) protocols.

The touchscreen 122 of the mobile device 100 provides an interface (e.g., an interface 200 of FIG. 2, an interface 300 of FIG. 3, an interface 400 of FIGS. 4A and 4B) between the user 118 and the mobile device 100 to enable the user 118 to initiate remote parking of the vehicle 102. For example, the touchscreen 122 is a resistive touchscreen, a capacitive touchscreen, and/or any other type of touchscreen that displays output information to and tactilely receives input information from the user 118 of the mobile device 100. In some examples, the mobile device 100 also includes other input devices (e.g., buttons, knobs, microphones, etc.) and/or output devices (e.g., speakers, LEDs, haptic transducers, etc.) to receive input information from and/or provide output information to the user 118 of the mobile device 100. In operation, the user 118 interacts with the touchscreen 122 for initiating remote parking of the vehicle 102 via the mobile device 100. Based on input received from the user 118 via the touchscreen 122, the communication module 120 of the mobile device sends a signal 124 to the communication module 116 of the vehicle 102 that instructs the autonomy unit 114 to initiate remote parking of the vehicle 102. Initiation of remote parking continues as the touchscreen 122 continues to receive an input from the user 118.

FIG. 2 illustrates an example user interface 200 displayed or otherwise presented by a touchscreen (e.g., the touchscreen 122 of FIG. 1) in accordance with the teachings herein. The interface 200 includes a motion track 202 presented, via the touchscreen 122, to the user (e.g., user 118 of the mobile device 100 of FIG. 1) during remote parking of the vehicle. In some examples, the motion track 202 is presented once the autonomy unit 114 initiates remote parking of the vehicle 102 to define an input pathway for the user 118 to follow while performing a maneuver during remote parking of the vehicle. In some examples, the user 118 continuously interacts with the motion track 202 by drawing a motion path 204 on the touchscreen 122 within the motion track 202 such that the autonomy unit 114 continues to remotely park the vehicle 102 within the available parking spot 104 as long as the touchscreen 122 continues to detect an input and/or movement within the motion track 202.

As illustrated in FIG. 2, the motion track 202 is defined by an inner boundary 206 and an outer boundary 208. The inner boundary 206 and the outer boundary 208 are spaced apart by a distance, percentage, and/or a number of pixels of the touchscreen 122 such that the motion track 202 has a width 210 defined by the distance and/or the number of pixels between the inner boundary 206 and the outer boundary 208. In some examples, the width 210 of the motion track 202 is predefined by the user 118 and/or software utilized for remote parking the vehicle 102 via the mobile device 100. While the motion track 202 is illustrated as a circle, it will be understood that other shapes, symbols, icons and configurations may be used for display of the motion track 202.

The interface 200 of FIG. 2, shows the motion path 204 associated with an input the user 118 provides via the touchscreen 122 to initiate and/or continue remote parking of the vehicle 102. The motion path 204 is displayed as a contiguous line that the user 118 draws within the motion track 202 via the touchscreen 122. As illustrated in FIG. 2, the motion path 204 includes an initiation input 212 and a travel point 214 opposite the travel point 214. The initiation input 212 corresponds to a location on the touchscreen 122 at which the user 118 begins to draw the motion path 204. The travel point 214 corresponds to a location on the touchscreen 122 at which the user 118 is currently touching or pressing the touchscreen 122 to continue drawing the motion path 204. In some examples, the initiation input 212 is represented by an arrow pointing in the direction the user 118 draws the motion path 204 and the travel point 214 is a dot showing the current location of the motion path 204; however other symbols an icons are possible to represent the initiation input 212 and/or the travel point 214.

In some examples, the interface 200 further includes a confidence band 216 surrounding the motion track 202. Similar to the motion track 202, the confidence band 216 has an inner band boundary 218 and an outer band boundary 220. The inner band boundary 218 and the outer band boundary 220 are spaced apart by a distance and/or a number of pixels of the touchscreen 122 such that the confidence band 216 has a width 222 defined by the distance and/or the number of pixels between the inner band boundary 218 and the outer band boundary 220. In some examples, the width 222 of the confidence band 216 is predefined by the user 118 to define an area of the touchscreen 122 where input is expected to occur while remote parking the vehicle 102. In other such examples, the width 222 of the confidence band 216 is defined by the software utilized for remote parking the vehicle 102 via the mobile device 100. The software defines the width 22 based on a historical data analysis of a plurality of motion paths 204 collected by the mobile device 100, via the touchscreen 122, during a plurality of previous remote parking occurrences of the vehicle 102. As such, the width 222 of the confidence band 216 defines an area of the touchscreen 122, based on the historical data analysis of the motion path 204, where the software expects intended input by the user 118 during remote parking of the vehicle 102. The motion track 202 is included within the width 222 of the confidence band 216, and as shown in FIG. 2, the motion track 202 is centered within the confidence band 216. However, based on the historical analysis results, performed by the software, the confidence band 216 may be placed in an alternative position relative to the motion track 202.

In some examples, the touchscreen 122 detects an input that corresponds with the initiation input 212, the travel point 214, and points of the motion path 204 therebetween to determine whether the mobile device 100 is to send the signal 124 to the autonomy unit 114 of the vehicle 102 to initiate and continue remote parking of the vehicle 102. For example, based on the information collected by the touchscreen 122, the mobile device 100 determines whether the travel point 214 is moving within the motion track 202. Further, in some examples, the mobile device 100 determines in which direction the travel point 214 is moving within the motion track 202 by comparing the travel point 214 (i.e., the current location) to the initiation input 212 (i.e., the starting location) and all points detected on the motion path 204 therebetween. Based on the movement of the travel point 214 on the interface 200 detected via the touchscreen 122, the mobile device 100 wirelessly sends a communication signal (e.g., the signal 124 of FIG. 1) to the autonomy unit 114 of the vehicle 102, via the communication module 116 and the communication module 120, to initiate and/or continue remote parking of the vehicle 102.

In some examples, the mobile device 100 is configured to send the signal 124 to initiate and/or perform remote parking of the vehicle 102 such that the autonomy unit 114 continues to remotely park the vehicle 102 as long as the touchscreen 122 continues to detect movement of the travel point 214 within the motion path 204. That is, the autonomy unit 114 performs both forward and backward maneuvers during remote parking the vehicle 102 in response to the touchscreen 122 continuing to detect movement of the travel point 214 within the motion track 202 (e.g., in a clockwise direction and/or a counterclockwise direction).

In some examples, the mobile device 100 is configured to send the signal 124 to initiate movement of the vehicle 102 in a particular direction during remote parking based on the detected direction of movement of the travel point 214 within the motion track 202. For example, the communication module 120 of the mobile device 100 sends the signal 124 to the vehicle 102 to initiate forward motion during remote parking of the vehicle 102 in response to the touchscreen 122 detecting that the travel point 214 is moving in a clockwise direction within the motion track 202. In some such examples, the communication module 120 of the mobile device 100 sends the signal 124 to initiate backward motion during remote parking of the vehicle 102 in response to the touchscreen 122 detecting that the travel point 214 is moving in a counterclockwise direction within the motion track 202. In other such examples, movement of the travel point 214 in the counterclockwise direction corresponds to forward motion of the vehicle 102, and movement of the travel point 214 in the clockwise direction corresponds to backwards motion of the vehicle 102. Further, in other examples, the motion track 202 of the interface 200 is designated only for initiating forward motion during remote parking when the travel point 214 is moving in the clockwise direction within the motion track 202.

Further, in some examples, a speed of motion of the travel point 214 detected via the touchscreen 122 corresponds to a travel speed of the vehicle 102 during remote parking. For example, the faster the user 118 moves the travel point 214 along the touchscreen 122, the faster the autonomy unit 114 moves the vehicle 102 during remote parking. Likewise, the slower the user 118 moves the travel point 214 along the touchscreen 122, the slower the autonomy unit 114 moves the vehicle 102 during remote parking.

FIG. 3 illustrates another example interface 300 of the touchscreen 122 of the mobile device 100, as shown in FIG. 1. In accordance with the teachings herein, the interface 300 includes the motion track 202 surrounded by the confidence band 216. A plurality of motion paths 302 received from the user 118 to initiate and/or perform remote parking of the vehicle 102 are shown within the inner boundary 206 and the outer boundary 208 defined by the motion track 202 and the inner boundary 218 and the outer boundary 220 defined by the confidence band 216. For example, to initiate and continue remote parking of the vehicle 102, the user 118 provides an initiation input 304 and draws the first motion path 302a, the second motion path 302b, and the third motion path 302c in a continuous motion along the motion path. Travel point 306 represents the current location of the input provided by the user 118 to the touchscreen 122 on the third motion path 302c. In some examples, the continuous input provided by the user (e.g., first motion path 302a, second motion path 302b, third motion path 302c) sometimes falls outside the motion track 202 and the confidence band 216. However, the first motion path 302a, the second motion path 302b, and the third motion path 302c, each follow a continuous motion path in a direction around the motion track 202. That is, while some portions of the first motion path 302a, the second motion path 302b, and the third motion path 302c, stray outside of the motion track 202, the motion paths are still within the confidence band 216. As such, each motion path represents a continuous and expected input provided by the user 118 during remote parking of the vehicle 102.

FIG. 4A illustrates another example interface 400 of the touchscreen of the mobile device 100, as shown in FIG. 1. In accordance with the teachings herein the interface 400 includes the motion track 202 surrounded by the confidence band 216. A plurality of unintended and/or anomalous inputs 402 received by the touchscreen 122 are shown inside and outside of the boundaries defined by the motion track 202 and the confidence band 216. In some examples, the unintended and/or anomalous inputs 402 are related to an intended input by the user 118 to initiate and continue remote parking of the vehicle 102. Alternatively, the unintended and/or anomalous inputs 402 are not related or unrelated to an intended input by the user 118 to initiate and/or continue remote parking of the vehicle 102. For example, to initiate remote parking of the vehicle 102, the user 118 provides an initiation input 404 (i.e., intended input) and draws the first motion path 402a (e.g., first anomalous input) along the motion track 202. The touchscreen 122 detects the initiation input 404 provided by the user 118. However, the touchscreen 122 detects the first motion path 402a as a non-continuous input that fails to follow a continuous path around the motion track 202. For example, the first motion path 402a includes a gap between the two portions of the path indicating the first notion path 402a was detected as a non-continuous path. The touchscreen 122 further detects a first anomalous input 402b, a second anomalous input 402c, a third anomalous input 402d, and a fourth anomalous input 402e, randomly distributed around the touchscreen 122. In some examples, the first motion path 402a, the first anomalous input 402b, the second anomalous input 402c, the third anomalous input 402d, and the fourth anomalous input 402e, are unintended inputs detected by the touchscreen 122 in areas that are both inside and outside of the boundaries defined by the motion track 202 and the confidence band 220.

FIG. 4B illustrates the interface 400 further including a notification box 406 and a notification acknowledgment input 408. In some examples, the mobile device 100 displays the notification box 406 to the user when an unintended and/or anomalous input (e.g., first motion path 402a and anomalous inputs 402b to 402e of FIG. 4A) is detected by the touchscreen 122. In some examples, the notification box 406 informs the user that an unintended and/or anomalous input has been detected and the user of the mobile device 100 is to confirm the touchscreen 122 is clean, dry and absent of any surface debris. Additionally and/or alternatively, the notification box 406 includes a plurality of possible causes for the detection of an anomalous input, such as but not limited to, using mobile device 100 in the rain, user's hands are wet, user is wearing gloves, user is holding mobile device 100 at touchscreen 122 periphery, and other such causes. Accordingly, in some examples the notification includes suggestions to the user 118 to correct the detection of anomalous inputs. For example, the notification box 406 includes a text message that informs the user of the mobile device 100 to confirm their hands are clean, dry and properly positioned on the mobile device 100, confirm the touchscreen 122 is clean and dry, and other such messages. In some examples, the notification box 406 includes the acknowledgement input 408 which requires the user of the mobile device 100 to provide an input (e.g., check a box) to the acknowledgement input 408 to confirm the notification was received.

As used herein, "unintended and/or anomalous inputs" are defined as a generally unintended input detected by the touchscreen 122 of the mobile device 100 and/or a generally intended input that is incorrectly detected by the touchscreen 122. In one non-limiting example, the first motion path 402*a* of FIG. 4A, illustrates a generally intended input that is incorrectly detected by the touchscreen 122 of the mobile device 100. As discussed above, the touchscreen 122 of the mobile device 100 is a resistive touchscreen, a capacitive touchscreen, and/or any other type of touchscreen that displays output information to and tactilely receives input information from the user 118 of the mobile device 100. For example, the user 118 provides input to the touchscreen 122 using a finger, or other such input device compatible with the mobile device 100, to contact the touchscreen 122. In some examples, the input provides an initial input to initiate the remote parking of the vehicle. In other such examples, the input draws the motion path 204 around the motion track 202 to provide continuous input during remote parking of the vehicle.

One known issue with receiving tactile input from the user 118 is interference between the user's finger and the touchscreen 122. For example, wearing gloves, designed for use with the touchscreen 122, can provide interference between the user's finger and the touchscreen 122. As such, use of gloves while holding and interacting with the mobile device 100 can cause the touchscreen 122 to detect unintended and/or anomalous inputs. The gloves tend to work with mixed results such that the touchscreen 122 generally detects intended input from the user 118 wearing the gloves. However, there are instances where performance of the gloves provides inconsistent and/or unsatisfactory results where the touchscreen 122 detects an input that does not match the user's input. For example, the first motion path 402*a* illustrates an intended input from the user that is incorrectly detected by the touchscreen 122. The initiation input 404 provided by the user 118 is detected within the motion track 202 and the touchscreen 122 detects the first motion path 402*a* moving within the boundaries of the motion track 202 and the confidence band 216. However, in this instance, the touchscreen 122 detects the first motion path 402*a* as a non-continuous motion path that includes a gap along the intended continuous pathway drawn by the user to continue remote parking of the vehicle 102. As such, user may become confused and/or frustrated that the touchscreen 122 failed to correctly detect the intended input. Additionally, the remote parking of the vehicle may be paused or even halted because the touchscreen 122 failed to correctly detect the intended input.

In another such example, the first anomalous input 402*b*, the second anomalous input 402*c*, the third anomalous input 402*d*, and the fourth anomalous input 402*e*, illustrate a plurality of unintended and/or anomalous inputs detected by the touchscreen 122 of the mobile device 100. For example, the anomalous inputs 402*b*, 402*c*, 402*d*, and 402*e*, are caused by an errant or unintended input provided by a finger, the palm of the hand, or other such unintended input detected by the touchscreen 122. In another such example, the anomalous inputs 402*b*, 402*c*, 402*d*, and 402*e* are caused by an unintended input, such as but not limited to, rain droplets, sweat droplets, dirt, or other such unintended input detected by the touchscreen 122. As such, the anomalous inputs 402*b*, 402*c*, 402*d*, and 402*e*, are not consistent with inputs provided by the user of the mobile device 100. In some examples, the anomalous inputs 402*b*, 402*c*, 402*d*, and 402*e* are detected by the mobile device 100 after the user stops providing input to the touchscreen 122.

In some examples, the remote parking system is configured to determine or otherwise classify a difference between a nominal input and an anomalous input. In one such example, the autonomy unit 114 of FIGS. 1 and 5, includes an input classifier (e.g., input classifier 502 of FIG. 5) configured to determine whether the detected input is consistent with a predetermined range of an expected input (e.g., within motion track 202 and confidence band 216 of FIG. 2) or whether the detected input is consistent with a predetermined range of an unexpected and/or anomalous input (e.g., outside the motion track 202 and confidence band 216). That is, nominal inputs are expected to have a consistent behavior detected within a certain location of the touchscreen 122 and anomalous inputs tend to have a more inconsistent and random behavior detected by the touchscreen 122. For example, the user of the mobile device 100 may provide input outside of the motion track 202 and/or the confidence band 216 while providing the continuous input (e.g., motion paths 302*a*, 302*b*, 302*c*) during remote parking of the vehicle 102. Accordingly, in some examples the input classifier 502 includes a timer that is used to determine whether the inputs detected by the touchscreen 122 are nominal inputs or anomalous inputs. As such, the input classifier 502 further includes a predetermined threshold for the number of anomalous inputs detected within a specified time. If the number of detected anomalous inputs exceeds the predetermined threshold the user is notified (e.g., presentation of notification box 406)

In some examples, input detected by the touchscreen 122 during remote parking of the vehicle 102 is classified as anomalous, by the input classifier 502, based on one or more of the following criteria: (1) input detected by touchscreen 122 is outside the boundary defined by the motion track 202 and/or confidence band 216; (2) a plurality of inputs persistently detected at a specific location of the touchscreen 122 beyond a predefined threshold of time; (3) a plurality of inputs persistently detected in area outside of the motion track 202 and/or confidence band 216 (e.g., liquid droplets on screen); (4) consecutive changes in variation in the angular velocity direction of the input detected by the touchscreen 122; (5) significant jumps in position of consecutive inputs detected by the touchscreen 122; and/or (6) repeated crossing of the circular pathway defined by the motion track 202 and the confidence band 216. In addition to the anomalous input criteria above, a continuous input provided by the user 118 (e.g., motion path 204, 302*a*, 302*b*, 302*c*) during initiation and/or continuation of remote parking of the vehicle 102, is classified as anomalous, by the input classifier 502, based on one or more of the additional criteria: (1) detected input fails to cross the initiation input 212, 304, of the motion path following a predetermined number of inputs received by the touchscreen 122; (2) detected input fails to cross the initiation input 212, 304, of the motion path within a predetermined time; and/or (3) detected input fails to cross checkpoints on the motion track 202 within a predetermined time. In some examples, the input classifier 502 is configured to prevent anomalous input detection from causing undesired input processing and/or activation of one or more modes of the remote parking application (e.g., application 506 of FIG. 5). For example, an anomalous and/or undesired input can cause undesired activation or processing of remote parking application modes, such as but not limited to, unlock/initiation, start a maneuver, pause a maneuver, and other such modes. As such, the input classifier 502 is further configured to classify a detected input as an anomalous input based on one or more of the following criteria: (1) repeated and/or persistent input detection outside of valid touchscreen 122 areas (e.g., unlock button, motion track 202, confidence band 216, etc.); (2) repeated and/or persistent activation of a specific touchscreen 122 location greater than a predetermined time threshold; (3) significant jump in touchscreen 122 location for consecutively detected inputs; and (4) repeated and/or persistent multi-location inputs detected on the touchscreen 122 (e.g., rain droplets on screen, activation at screen edge, etc.).

In some embodiments, the input classifier 502, is an intelligent input classifier that includes one or more machine learning models and/or algorithms, such as but not limited to, a support vector machine, an artificial neural network, a convolutional neural network, and other such models and/or algorithms. Accordingly, the intelligent input classifier 502 is taught or otherwise trained to classify inputs using input data from known nominal inputs and anomalous inputs. In one non-limiting example, the intelligent input classifier 502 is trained that nominal inputs include continuous motion paths within the defined boundary of the motion track 202 and/or confidence band 216 of FIG. 3, (e.g., motion paths 302a, 302b, 302c). The intelligent input classifier 502 is further trained that unintended and/or anomalous inputs include non-continuous motion paths (e.g., motion path 402a) and unintended inputs detected by the touchscreen 122 (e.g., anomalous inputs 402b, 402c, 402d).

In some examples, the intelligent input classifier 502 is further configured to distinguish between different anomalous inputs detected by the touchscreen 122. For example, the intelligent input classifier 502 is trained to identify input data such as the non-continuous motion path 402a is caused by input by a user wearing gloves. Additionally, the intelligent input classifier 502 is trained to identify the unintended inputs 402b, 402c, 402d, 402e caused by input data, such as but not limited to, liquid droplets present on the touchscreen, the user holding or contacting a periphery of the touchscreen 122, or other such unintended inputs. In some examples, the intelligent input classifier 502 is configured to apply criteria to filter or reject a detected input that is clearly identified as an anomalous and/or intended input such as but not limited to, repeated and/or persistent multi-location inputs detected on the touchscreen 122 (e.g., rain droplets on screen, activation at screen edge, etc.), repeated and/or persistent activation of a specific touchscreen 122 location greater than a predetermined time threshold, and repeated and/or persistent input detection around the touchscreen 122 edge. In some embodiments, the intelligent input classifier 502 applies criteria to filter and/or reject detected anomalous inputs after receipt of the acknowledgement input 408 from the user of the mobile device 100. For example, in response to the detection an anomalous input, the autonomy unit 114 transmits a notification signal to the mobile device 100 and the notification box 406 and acknowledgment input 408 is displayed on the touchscreen 122. The intelligent input classifier 502 will filter any detected anomalous inputs detected once the autonomy unit 114 receives confirmation of the acknowledgment input 408.

Figure 5:
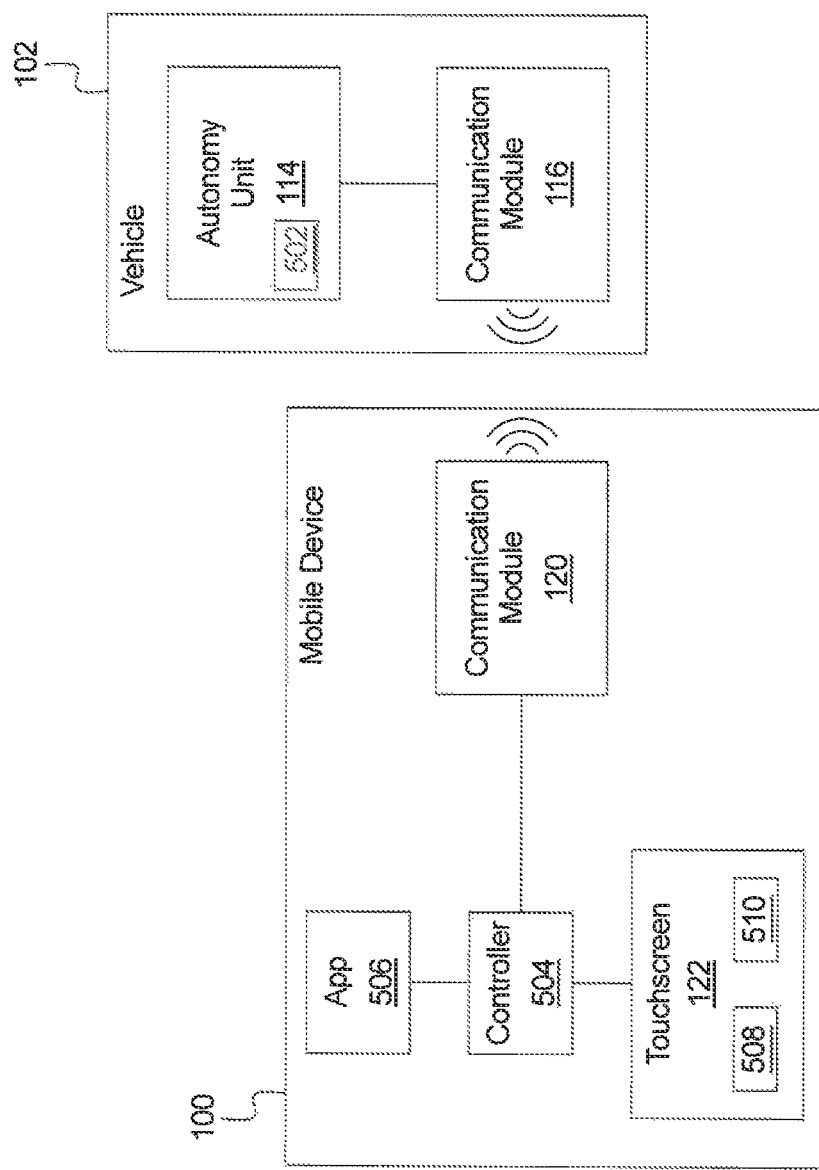
FIG. 5 is a block diagram of the mobile device and the vehicle of FIG. 1.

FIG. 5 is a block diagram of the mobile device 100 and the vehicle 102. As illustrated in FIG. 5, the mobile device 100 includes the touchscreen 122, a controller 504, a remote parking application 506 (i.e., app), and the communication module 120. The controller 504 is communicatively coupled to the remote parking app 506, the touchscreen 122, and the communication module 120 within the mobile device 100.

The autonomy unit 114 and the communication module 116 are communicatively coupled together within the vehicle 102. Further, the communication module 120 of the mobile device 100 and the communication module 116 of the vehicle 102 are communicatively coupled together (e.g., via wireless communication). Further, as illustrated FIG. 5, the touchscreen 122 includes a display 508 and sensors 510. The display 508 presents the interface(s) to the user 118 of the mobile device 100, and the sensors 510 (e.g., capacitive sensors, resistance sensors) detect input(s) provided by the user 118 to the touchscreen 122 of the mobile device 100. Furthermore, the autonomy unit 114 of the vehicle 102 includes an input classifier 502 configured to analyze and/or classify input(s) detected by the touchscreen 122. In some examples, the input classifier 502 analyzes the received input(s) to determine whether the input is consistent with a mode of the remote parking app 506 such as, unlock and/or initiation, continuous input verification, and other such modes. In some examples the input classifier 502 is configured as an intelligent input classifier where the received input(s) is/are fed into a support vector machine, an artificial neural network, a convolutional neural network, and other such intelligent classifiers. As such, the intelligent input classifier 502 is trained or otherwise programmed to include input data from known nominal inputs and input data from known unintentional and/or anomalous inputs (e.g., input with wet/dirty hands, input wearing gloves, input from user holding edge of mobile device 100, and other random inputs).

In operation, the controller 504 presents an interface (e.g., the interface 200 of FIG. 2) of the remote parking app 506 to the user 118 via the display 508 of the touchscreen 122. As the interface is being presented, the controller 504 receives an input (e.g., a dragging motion along the touchscreen 122 such as within along the motion track 202 of FIG. 2) provided by the user 118 for initiating remote parking of the vehicle 102. For example, the sensors 510 of the touchscreen 122 detect the input provided by the user 118. The controller 504 of the mobile device 100 sends a signal (e.g., a first signal) to the autonomy unit 114 of the vehicle 102 via the communication module 120 and the communication module 116 to initiate remote parking of the vehicle 102.

While the interface is presented on the touchscreen 122, the controller 504 monitors whether the remote parking app 506 continues to receive an input. In some examples, the controller 504 prompts the remote parking app 506 to send a signal to the controller 504 upon the presentation of the interface and the detection of a nominal input. In other examples, the remote parking app 506 sends the signal to the controller 504 upon presentation of the interface and the detection of an unintended and/or anomalous input. For example, the remote parking app 506 sends a first input signal (e.g., a digital data of '0') to the controller 504 that indicates the remote parking app 506 has received a nominal input. The remote parking app 506 sends a second input signal (e.g., a digital data of '1') to the controller 504 that indicates the remote parking app 506 has received an unintended and/or anomalous input. The remote parking app 506 continuing to receive the second data input signal (e.g., the data signal of '1') indicates that the touchscreen 122 is detecting or otherwise receiving unintended and/or anomalous inputs.

To prevent the autonomy unit 114 from continuing to remotely park the vehicle 102 while the remote parking app 504 is detecting anomalous and/or unintended inputs, the controller 504 sends the signal (e.g., the second signal) to the vehicle 102 and the autonomy unit 114 pauses or halts the remote parking of the vehicle 102 in response to detection of the unintended and/or anomalous input. In some examples, the controller 504 stops sending the signal (e.g., the first signal) to the autonomy unit 114 to stop initiating the remote parking. In other examples, the controller 502 sends another signal (e.g., a second signal) to the autonomy unit 114 via the communication module 120 and the communication module 116 to stop initiating the remote parking.

Figure 6:
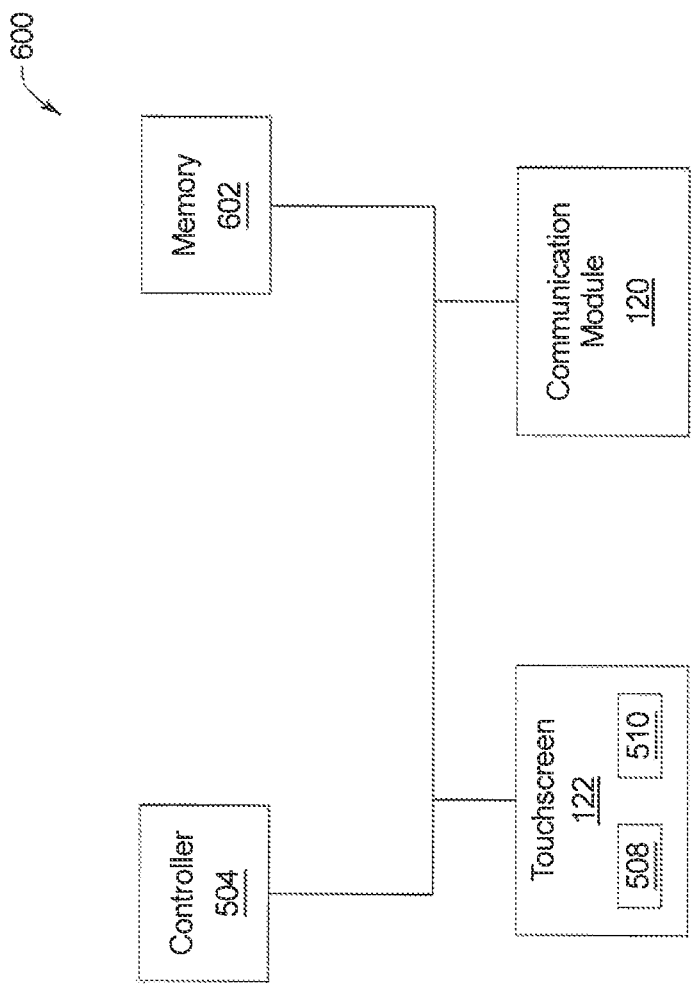
FIG. 6 is a block diagram of electronic components of the mobile device of FIG. 1.

FIG. 6 is a block diagram of electronic components 600 of the mobile device 100. As illustrated in FIG. 6, the electronic components 600 include the controller 504, memory 602, the communication module 120, and the touchscreen 122 that includes the display 508 and the sensors 510.

The controller 504 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs).

The memory 602 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 602 includes multiple kinds of memory, particularly volatile memory and non-volatile memory.

The memory 602 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 602, the computer readable medium, and/or within the controller 504 during execution of the instructions. For example, the remote parking app 506 of FIG. 5 includes one or more sets of instructions that are embedded on the memory 602 and are executed by the controller 504.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

Figure 7:
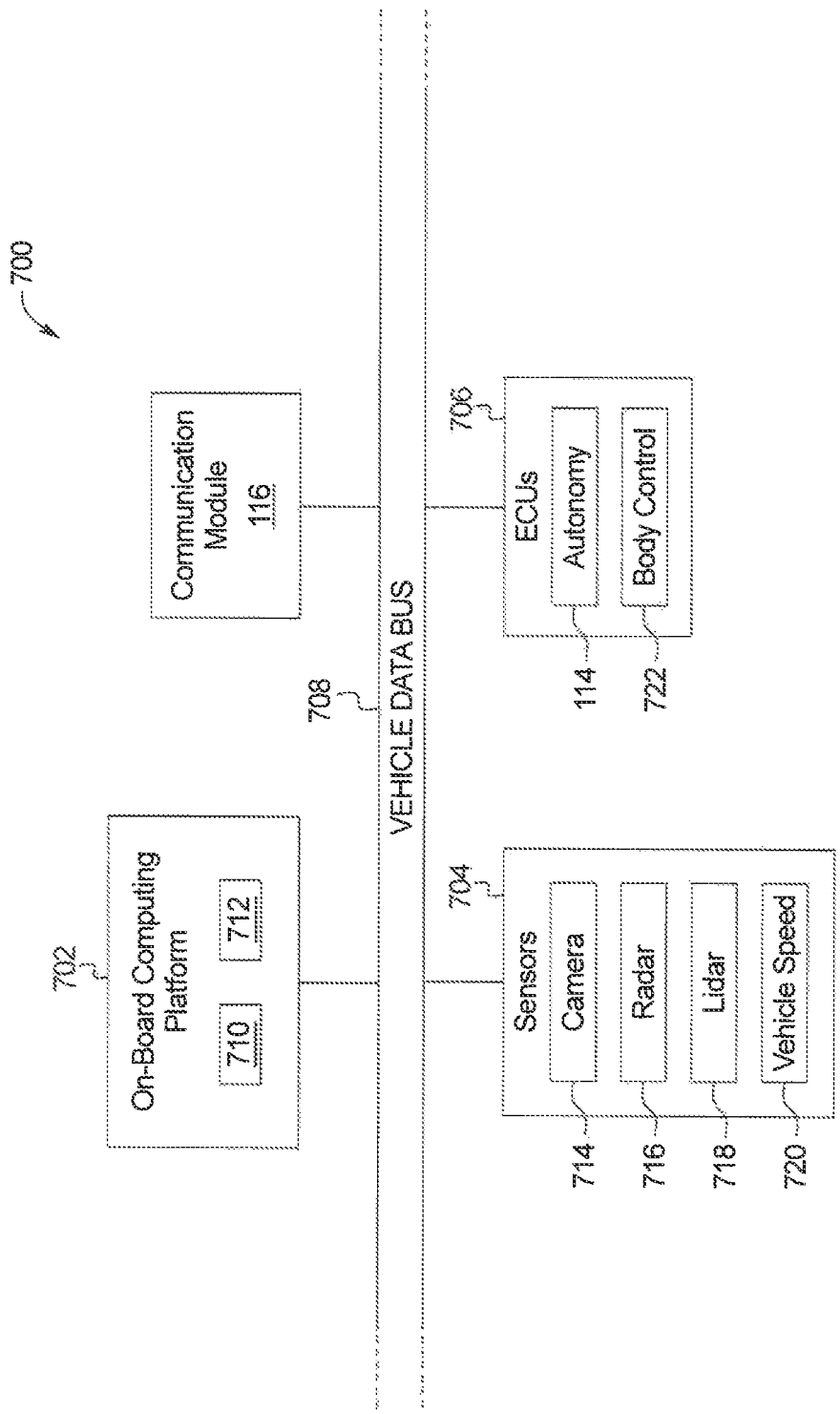
FIG. 7 is a block diagram of electronic components of the vehicle of FIG. 1.

FIG. 7 is a block diagram of electronic components 700 of the vehicle 102. As illustrated in FIG. 7, the electronic components 700 include an on-board computing platform 702, the communication module 116, sensors 704, electronic control units (ECUs) 706, and a vehicle data bus 708.

The on-board computing platform 702 includes a microcontroller unit, controller or processor 710 and memory 712. The processor 710 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 712 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memory 712 includes multiple kinds of memory, particularly volatile memory and non-volatile memory.

The memory 712 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 712, the computer readable medium, and/or within the processor 710 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The sensors 704 are arranged in and around the vehicle 102 to monitor properties of the vehicle 102 and/or an environment in which the vehicle 102 is located. One or more of the sensors 704 may be mounted to measure properties around an exterior of the vehicle 102. Additionally or alternatively, one or more of the sensors 704 may be mounted inside a cabin of the vehicle 102 or in a body of the vehicle 102 (e.g., an engine compartment, wheel wells, etc.) to measure properties in an interior of the vehicle 102. For example, the sensors 704 include accelerometers, odometers, tachometers, pitch and yaw sensors, wheel speed sensors, microphones, tire pressure sensors, biometric sensors and/or sensors of any other suitable type.

In the illustrated example, the sensors 704 include a camera 714, a RADAR sensor 716, a LIDAR sensor 718, and a vehicle speed sensor 720. For example, the camera 714 obtains image(s) and/or video to enable detection and location of nearby object(s). The RADAR sensor 716 detects and locates the nearby object(s) via radio waves, and the LIDAR sensor 718 detects and locates the nearby object(s) via lasers. The camera 714, the RADAR sensor 716, and/or the LIDAR sensor 718 monitor an area surrounding the vehicle 102 to facilitate autonomous parking of the vehicle 102 into the available parking spot 104. Further, the vehicle speed sensor 720 monitors a speed of the vehicle 102 to facilitate autonomous parking of the vehicle 102 into the available parking spot 104.

The ECUs 706 monitor and control the subsystems of the vehicle 102. For example, the ECUs 706 are discrete sets of electronics that include their own circuit(s) (e.g., integrated circuits, microprocessors, memory, storage, etc.) and firmware, sensors, actuators, and/or mounting hardware. The ECUs 706 communicate and exchange information via a vehicle data bus (e.g., the vehicle data bus 708). Additionally, the ECUs 706 may communicate properties (e.g., status of the ECUs 706, sensor readings, control state, error and diagnostic codes, etc.) to and/or receive requests from each other. For example, the vehicle 102 may have seventy or more of the ECUs 706 that are positioned in various locations around the vehicle 102 and are communicatively coupled by the vehicle data bus 708.

In the illustrated example, the ECUs 706 include the autonomy unit 114 and a body control module 722. The autonomy unit 114 autonomously controls motive functions of the vehicle 102, for example, to remotely park the vehicle 102 in the available parking spot 104. The body control module 722 controls one or more subsystems throughout the vehicle 102, such as power windows, power locks, an immobilizer system, power mirrors, etc. For example, the body control module 722 includes circuits that drive one or more of relays (e.g., to control wiper fluid, etc.), brushed direct current (DC) motors (e.g., to control power seats, power locks, power windows, wipers, etc.), stepper motors, LEDs, etc.

The vehicle data bus 708 communicatively couples the communication module 116, the on-board computing platform 702, the sensors 704, and the ECUs 706. In some examples, the vehicle data bus 708 includes one or more data buses interconnected by a gateway. The vehicle data bus 708 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 8:
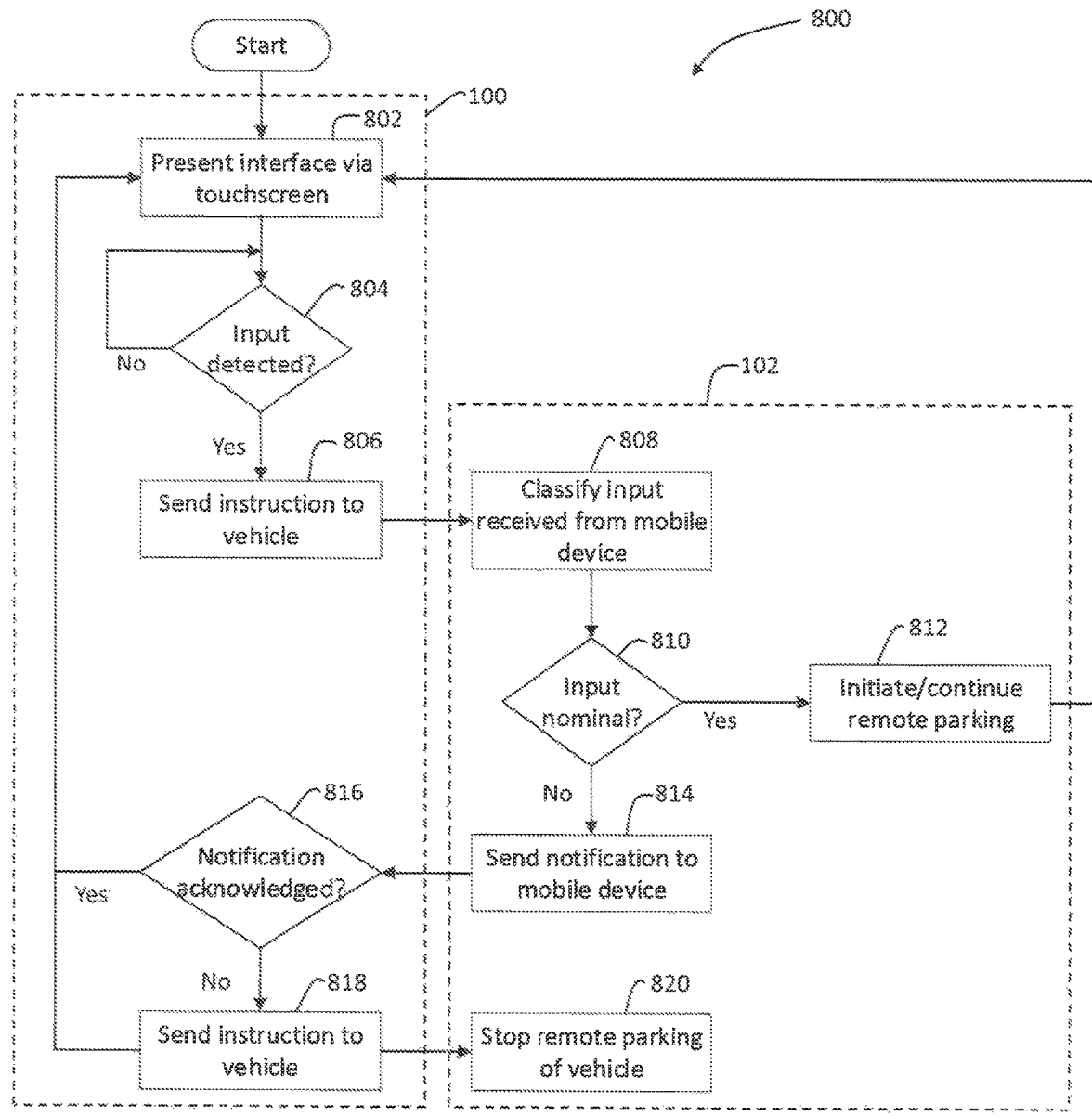
FIG. 8 is a flowchart for verifying an interface of a mobile device for remote parking of a vehicle in accordance with the teachings herein.

FIG. 8 is a flowchart of an example method 800 to verify provide feedback to input received on an interface of a mobile device for remote parking of a vehicle in accordance with the teachings herein. The flowchart of FIG. 8 is representative of machine readable instructions that are stored in memory (such as the memory 602 of FIG. 6) and include one or more programs that are executed by a processor (such as the controller 504 of FIGS. 5 and 6) of the mobile device 100 of FIGS. 1 and 5 and 6. Additionally or alternatively, the flowchart of FIG. 8 is representative of machine readable instructions that are stored in memory (such as the memory 712 of FIG. 7) and include one or more programs which, when executed by a processor (such as the processor 710 of FIG. 7), cause the autonomy unit 114 to remotely park the vehicle 102 of FIGS. 1, 5, and 7. While the example program is described with reference to the flowchart illustrated in FIG. 8, many other methods of verifying a remote parking interface on a mobile device may alternatively be used. For example, the order of execution of the blocks may be rearranged, changed, eliminated, and/or combined to perform the method 800. Further, because the method 800 is disclosed in connection with the components of FIGS. 1-7, some functions of those components will not be described in detail below.

Initially, at block 802, the controller 504 of the mobile device 100 presents an interface (e.g., the interface 200 of FIG. 2) of the remote parking app 506 to the user 118 via the display 508 of the touchscreen 122. At block 804, the controller 504 determines whether an input has been detected or otherwise received via the sensors 510 of the touchscreen 122 while the interface is being presented. In response to the controller 504 determining that an input has not been received from the user 118, the method 800 remains at block 804. Otherwise, in response to the controller 504 determining that an input (e.g., touching of initiation input 212, a dragging motion along the touchscreen 122 such as within along the motion path 204 of FIG. 2) has been received, the method 800 proceeds to block 806.

At block 806, the controller 504 of the mobile device 100 sends an instruction (e.g., a first signal) to the autonomy unit 114 of the vehicle 102 via the communication module 120 and the communication module 116 to initiate remote parking of the vehicle 102. The autonomy unit 114 includes the input classifier 502 that determines whether the input is detected within a certain range or area of the display 508 (e.g., within the motion track 202 and confidence band 216) or the input is detected outside the certain range. At block 808, the autonomy unit 114 and the input classifier 502 classify the input as being a nominal input or an anomalous input.

At block 810, the autonomy unit 114 determines whether the sensors 508 of the touchscreen 122 have continuously received a nominal input from the user 118 consistent with performing remote parking of the vehicle. In response to determining the autonomy unit 114 classified the input as a nominal input, the method 800 proceeds to block 812. At block 812 the autonomy unit 114 sends a signal to the mobile device 100 to initiate and/or continue the remote parking of the vehicle 102.

Referring back to block 810, in response to determining the autonomy unit 114 classified the input as an anomalous and/or unintended input, the method 800 proceeds to block 814. At block 814, the autonomy unit 114 sends a notification (e.g., notification box 406 of FIG. 4B) to the mobile device 100 indicating to the user that an anomalous input was detected. The notification box 406 includes an acknowledgment input (e.g., acknowledgement input 408 of FIG. 4B) that requires the user 118 of the mobile device 100 to provide an input to the touchscreen 122 to confirm the notification box 406 was received.

At block 816, the controller 504 determines whether the notification was received and/or acknowledged by the user. In response to the controller 504 determining the notification acknowledgment was received from the user 118, the remote parking app 506 returns to block 802 and continues to present the interface to the user 118 such that the user is able to proceed with remote parking the vehicle 102.

In response to the controller 504 determining the notification acknowledgment was not received from the user, the method 800 proceeds to block 818 at which the controller 504 continues to send the instruction (e.g., a second signal) to the vehicle 102 to stop or pause remote parking of the vehicle 102. At block 820, the autonomy unit 114 terminates or aborts the remote parking of the vehicle 102.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle system comprising:
   a mobile device including a controller and a touchscreen configured to present an interface of a remote parking app, wherein the interface includes a motion track, and wherein the controller receives an input responsive to the remote parking app;
   a vehicle autonomy unit communicably coupled to the mobile device and configured to receive an input signal which corresponds with the received input; and
   an input classifier coupled to the vehicle autonomy unit, wherein the input classifier verifies the received input signal complies with an input classification, and wherein the vehicle autonomy unit sends a notification comprising an acknowledgement input to the mobile device if the received input signal is an anomalous input that is non-compliant with the input classification, and wherein the input classifier is further configured to filter, after a confirmation of the acknowledgement input is received, subsequent anomalous inputs.

2. The vehicle system of claim 1, wherein a compliant input is defined as a nominal input by the input classification, and wherein a non-compliant input is defined as the anomalous input by the input classification.

3. The vehicle system of claim 2, wherein the input classification includes a timer that starts after presentation of the interface, and wherein the notification is presented when a predefined number of anomalous inputs are detected within a predetermined length of time, as measured by the timer.

4. The vehicle system of claim 2, wherein the mobile device receives the input when the touchscreen detects a dragging motion within the motion track, and wherein the nominal input is detected within the motion track and the anomalous input is detected outside of the motion track.

5. The vehicle system of claim 4, wherein the nominal input is a continuous input detected within a defined confidence band surrounding the motion track, and wherein the anomalous input is an arbitrary and non-continuous input detected inside or outside the defined confidence band surrounding the motion track.

6. The vehicle system of claim 1, wherein the vehicle autonomous unit is further configured to:
   pause or stop a remote parking function based on the anomalous non compliant input; and
   resume the remote parking function based on receiving an indication from the mobile device of an acknowledgement input to the notification on the mobile device.

7. The vehicle system of claim 1, wherein the input classification includes an intelligent input classification programmed with a known set of input data that defines the received input as one of a nominal input and the anomalous input.

8. The vehicle system of claim 7, wherein the intelligent input classification identifies a first type of anomalous input, based on analysis between the anomalous input and the known set of input data, wherein the notification includes an identification of the first type of the anomalous input, wherein the notification includes a suggestion to correct detection of the anomalous input, and wherein the suggestion is based on the first type of anomalous input.

9. The vehicle system of claim 8, wherein the first type of anomalous input is a non-continuous input within the motion track that includes a gap.

10. The vehicle system of claim 7, wherein the intelligent input classification identifies a second type of anomalous input, based on analysis between the anomalous input and the known set of input data, wherein the second type of anomalous input includes one or more inputs located outside of the motion track, wherein the notification includes an identification of the second type of anomalous input, wherein the notification includes a request to confirm that a touchscreen of the mobile device is clean, dry, and absent of debris.

11. A method for verifying inputs for remote parking of vehicles comprising:
   presenting, via a touchscreen of a mobile device, an interface of a remote parking app, wherein the interface includes a motion track;
   receiving an input at a controller of the mobile device via the touchscreen responsive to presenting the interface;
   receiving, by a vehicle autonomy unit, an input signal sent by the mobile device;
   verifying, by an input classifier, the received input signal complies with an input classification; and
   sending, via the vehicle autonomy unit, a notification comprising an acknowledgement input to the mobile device if the received input signal is non-compliant with the input classification, wherein the input classifier is further configured to filter, after a confirmation of the acknowledgement input is received, subsequent anomalous inputs.

12. The method of claim 11, wherein a compliant input is defined as a nominal input by the input classification, and wherein a non-compliant input is defined as the anomalous input by the input classification.

13. The method of claim 12, further including starting a timer after presenting the interface, wherein presenting the notification occurs when a predefined number of anomalous inputs are detected within a predetermined length of time, as measured by the timer.

14. The method of claim 12, wherein presenting the interface includes presenting the motion track and receiving the input via the touchscreen includes detecting a dragging motion within the motion track, and wherein the nominal input is classified by detecting the dragging motion within the motion track and the anomalous input is classified by detecting the dragging motion outside of the motion track, wherein the nominal input is a continuous input detected within a defined confidence band surrounding the motion track, and wherein the anomalous input is an arbitrary and non-continuous input detected inside and outside the defined confidence band surrounding the motion track.

15. The method of claim 11, wherein presenting the notification includes presenting an acknowledgement input, and wherein the acknowledgement input is detected, by the controller, to verify the interface is capable of producing an intended input.

16. The method of claim 11, wherein the input classification includes an intelligent input classification programmed with a known set of input data defining the received input as one of a nominal input and the anomalous input.

17. The method of claim 16, further including identifying a first type of anomalous input, based on an analysis between the anomalous input and the known set of input data, wherein presenting the notification includes presenting an identification of the first type of anomalous input, and wherein the notification includes suggestion to correct detection of the anomalous input, and wherein the suggestion is based on the first type of anomalous input.

18. A non-transitory tangible computer readable medium including instructions which, when executed, cause a machine to:
   present, via a touchscreen of a mobile device, an interface of a remote parking app wherein the interface includes a motion track;
   receive an input at a controller of the mobile device via the touchscreen responsive to presenting the interface;
   receive, by a vehicle autonomy unit, an input signal sent by the mobile device;
   verify, by an input classifier, the received input signal complies with an input classification; and
   send, via the vehicle autonomy unit, a notification comprising an acknowledgement input to the mobile device if the received input signal is non-compliant with the input classification, wherein the input classifier is further configured to filter, after a confirmation of the acknowledgement input is received, subsequent anomalous inputs.

19. The non-transitory tangible computer readable medium of claim 18, wherein a compliant input is defined as a nominal input by the input classification, and wherein a non-compliant input is defined as the anomalous input by the input classification.

20. The non-transitory tangible computer readable medium of claim 19, wherein the interface includes the motion track and the controller receives the input when the touchscreen detects a dragging motion within the motion track, and wherein the nominal input is detected within the motion track and the anomalous input is detected outside of the motion track, wherein the notification includes an acknowledgement input and an activation of the acknowledgement input is received, by the controller, to verify the interface is capable of producing an intended input.

* * * * *